United States Patent
Kamei et al.

(12)

(10) Patent No.: US 6,335,773 B1
(45) Date of Patent: Jan. 1, 2002

(54) LIQUID CRYSTAL DISPLAY DEVICE IN WHICH THE LIGHT LENGTH, POLARIZING AXIS, AND ALIGNMENT DIRECTION ARE RELATED

(75) Inventors: Tatsuo Kamei; Takeshi Tanaka, both of Chiba (JP)

(73) Assignee: Hitachi LTD, Tokyo (JP)

( * ) Notice: Subject to any disclaimer, the term of this patent is extended or adjusted under 35 U.S.C. 154(b) by 0 days.

(21) Appl. No.: 09/215,275

(22) Filed: Dec. 18, 1998

(30) Foreign Application Priority Data

Dec. 22, 1997 (JP) ................................ 9-353138

(51) Int. Cl.[7] ................... G02F 1/1335; G02F 1/1337
(52) U.S. Cl. ............................... 349/96; 349/123
(58) Field of Search ........................ 349/96, 123

(56) References Cited

U.S. PATENT DOCUMENTS 5,579,139 A  * 11/1996  Abileah et al. .................. 349/96

FOREIGN PATENT DOCUMENTS

JP         61-75321    * 4/1986 .................. 349/126

* cited by examiner

*Primary Examiner*—Walter J. Malinowski

(57) ABSTRACT

A liquid crystal display device includes a liquid crystal panel having a pair of opposing transparent substrates each having an alignment film on an inner surface thereof, at least one of the substrates having pixel electrodes on the inner surface thereof, a liquid crystal layer sandwiched between the alignment films, and a pair of polarizers, one of which is disposed in front of the liquid crystal layer and another of which is disposed behind the liquid crystal layer; a driving circuit for supplying voltages to the liquid crystal panel in accordance with display signals; and a backlight having a line light source and disposed behind the liquid crystal panel, wherein each alignment direction of the alignment films is parallel with a polarizing axis of one of the polarizers adjacent thereto, and the polarizing axis of the another of the pair of polarizers is perpendicular to a longitudinal axis of the line light source.

20 Claims, 30 Drawing Sheets

FIG. 5
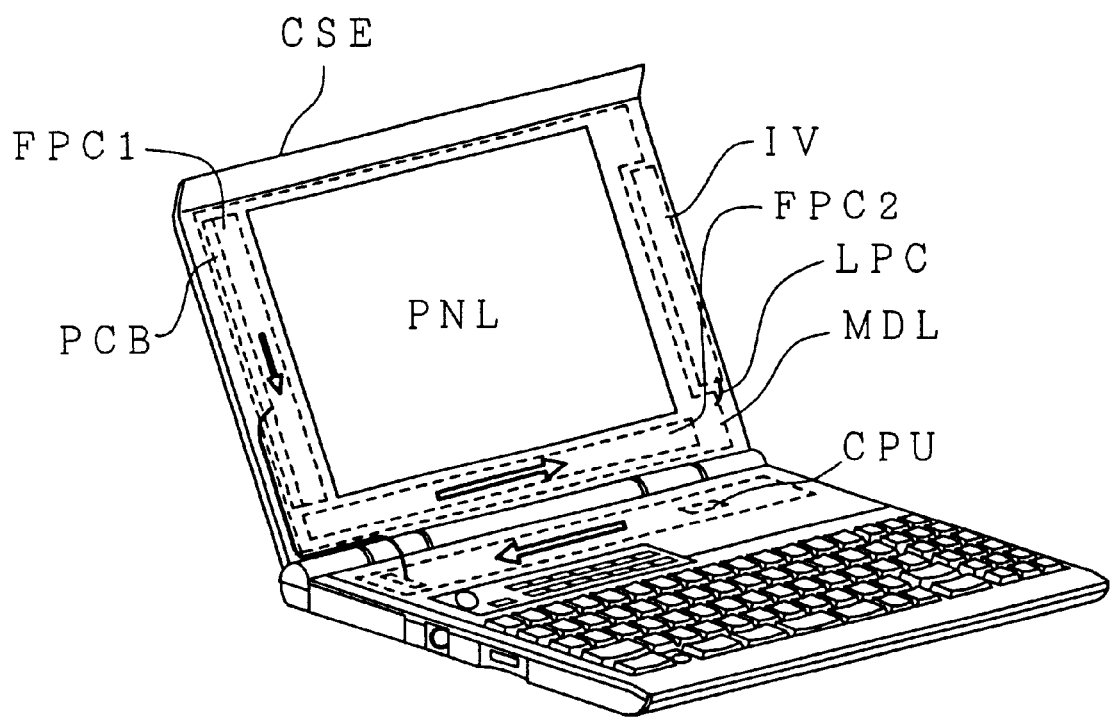
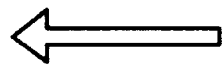
Direction of Signals

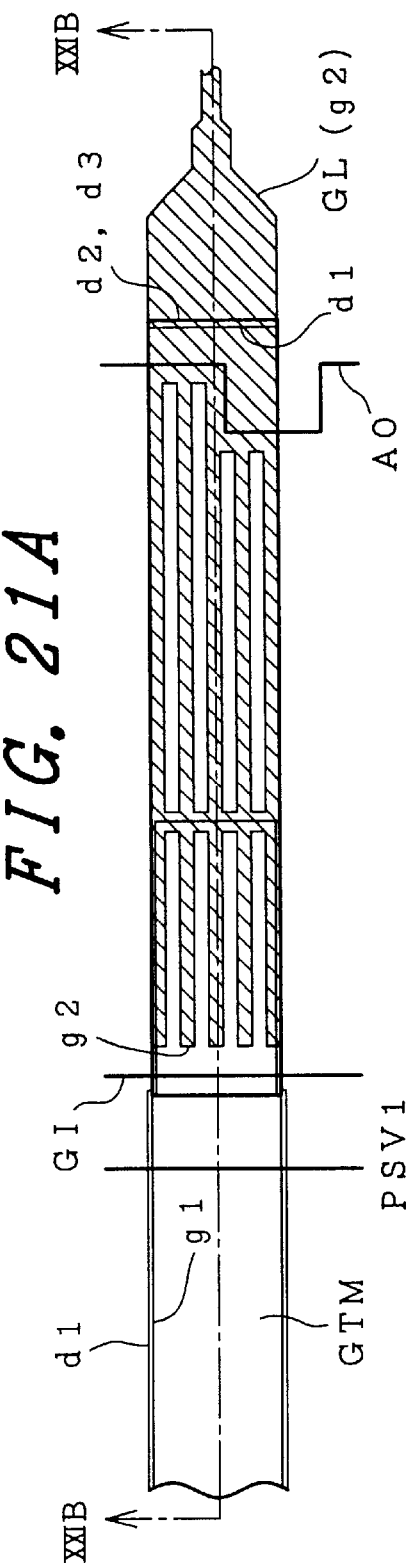
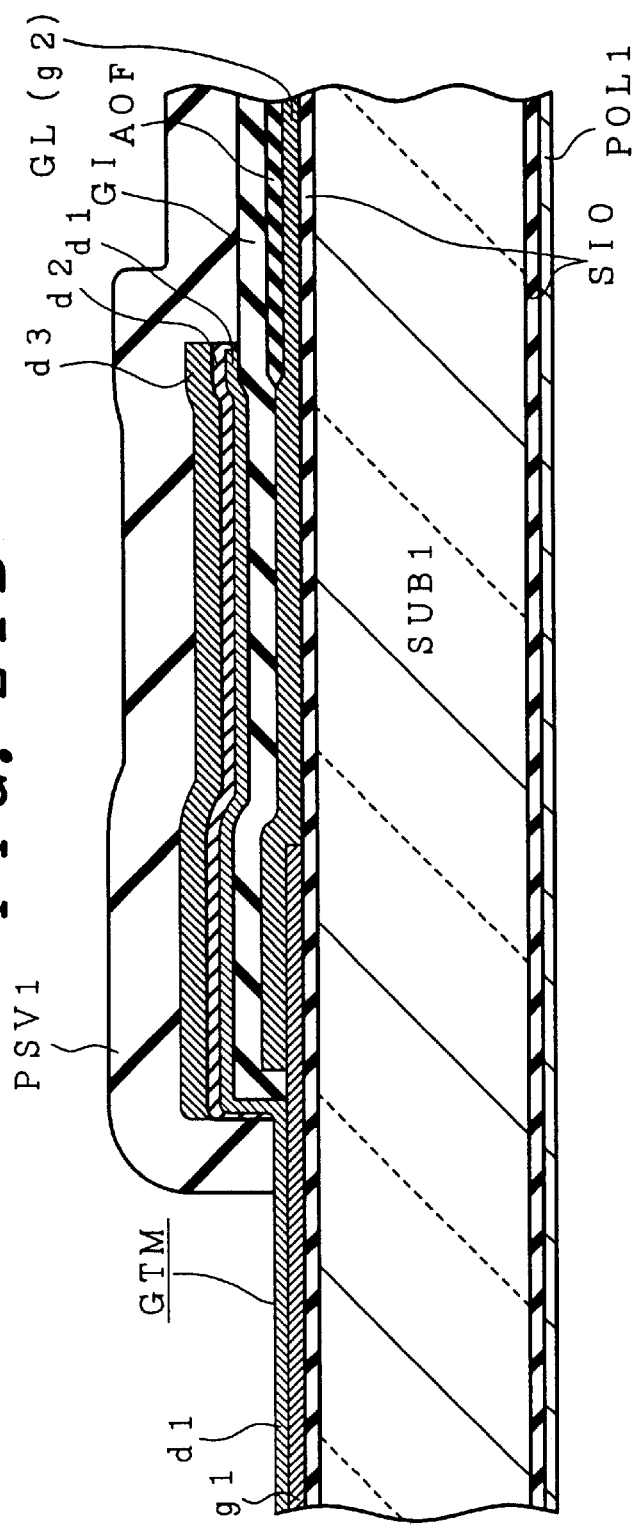

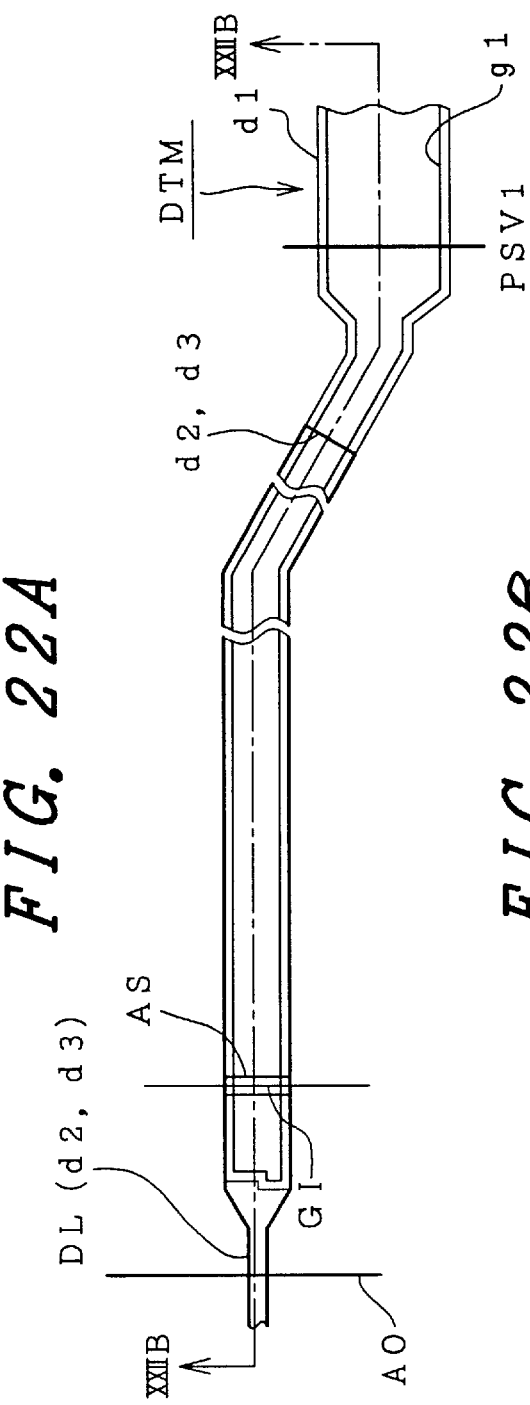
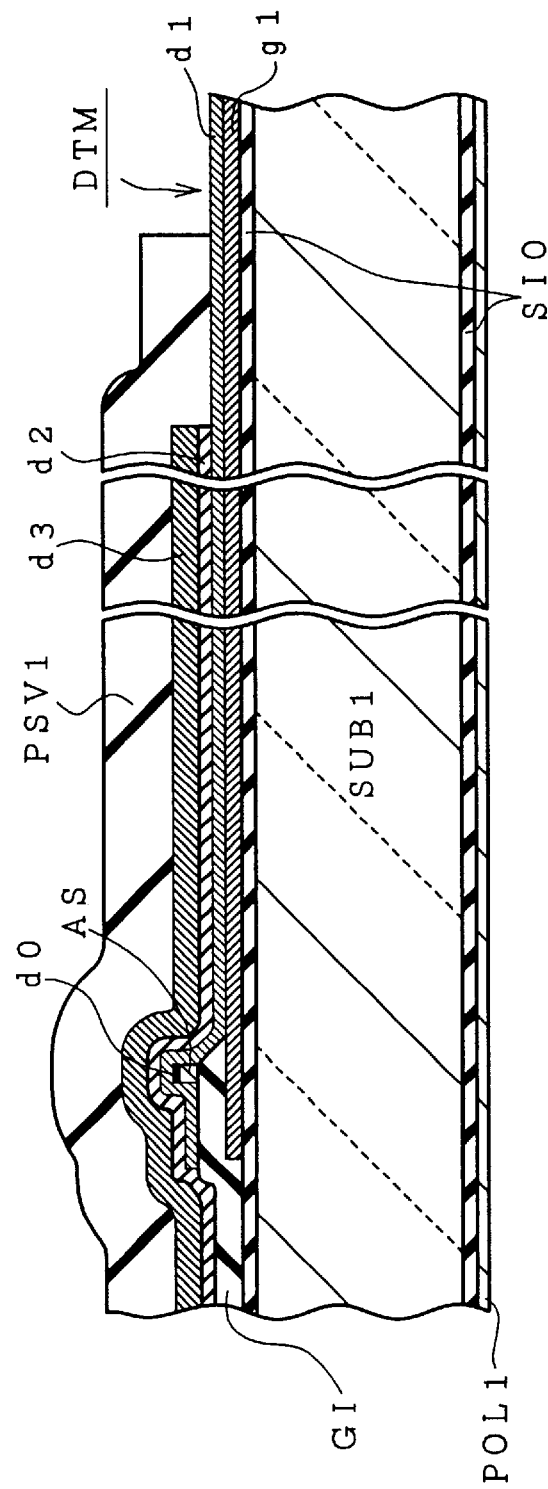
FIG. 22A
FIG. 22B

LIQUID CRYSTAL DISPLAY DEVICE IN WHICH THE LIGHT LENGTH, POLARIZING AXIS, AND ALIGNMENT DIRECTION ARE RELATED

BACKGROUND OF THE INVENTION

The present invention relates to a liquid crystal display device (hereinafter referred to as LCD), and particularly to an LCD capable of displaying a high quality image by preventing non-uniformity in its display due to distortion of its transparent substrate caused by heat from a line light source of its backlight. High definition LCDs for use in notebook computers and computer monitors are such that a liquid crystal panel, a driving circuit board therefor, a light source for illuminating the panel from behind back (a so-called backlight) are stacked and fixed between an upper frame having a display window and a lower frame to form a liquid crystal display module, and this module is housed in a display part of the notebook computers and computer monitors.

The LCD of this type includes a liquid crystal panel basically formed of a pair of transparent substrates at least one of which is made of material such as glass and a liquid crystal layer sandwiched therebetween, and a driving circuit which is mounted on the periphery of the panel for applying appropriate voltages to pixel electrodes on one or both of the transparent substrates to display an image.

Methods of producing images are classified into two types:

(1) A type in which desired pixel electrodes of the liquid crystal panel are selectively switched into either their on or off states by applying voltages thereto directly and selectively; and (2) A type in which each pixel electrode is provided with its own active element and each pixel is switched into either their on or off states by selecting its own active element.

The latter type is called an active matrix type, and is dominant over other types in terms of contrast ratio and fast optical switching speed. The conventional active matrix type LCD employs a so-called vertical field type which applies an electric field between opposing electrodes formed on a pair of substrates, respectively, for changing orientation of liquid crystal molecules therebetween. This type of LCDs are disclosed in Japanese Patent Laid-Open No. Sho 61-214548 and Japanese Utility Model Laid-Open No. Hei 2-13765, for example.

Recently, a so-called horizontal field type (also referred to as in-plane switching type, hereinafter IPS type) LCD was realized which applies to its liquid crystal layer an electric field substantially in parallel with the plane of its substrates. As for the IPS type LCD, LCDs employing both pixel electrodes in the form of interleaved combs on one of a pair of opposing substrates are known for the very wide viewing angles (Japanese Patent Publication No. Sho 63-21907 and U.S. Pat. No. 4,345,249).

In prior art LCDS, usually the longitudinal axis of a linear lamp constituting a backlight is disposed along a side (usually long side) of the liquid crystal panel, and as a result the longitudinal axis of the linear lamp is at 45° and 135° with respect to polarizing axes of a pair of polarizers disposed in front of and behind the liquid crystal panel.

FIG. 31 illustrates the arrangement of a liquid crystal panel and a linear lamp of a backlight in a prior art LCD, reference character SUB1 denotes a lower transparent substrate (hereinafter a TFT substrate) having thin film transistors (hereinafter TFTs) formed thereon, SUB2 is an upper transparent substrate (hereinafter a color filter substrate) having a color filter formed thereon, LP is a linear lamp, POL2S is a polarizing axis of a polarizer stacked on an outer surface of the color filter substrate SUB2, ORI2S is an alignment direction of surface alignment of liquid crystal molecules provided by an alignment film (also referred to as an orientation film) formed on an inner surface of the color filter substrate SUB2, POL1S is a polarizing axis of a polarizer stacked on an outer surface of the TFT substrate SUB1, ORI1S is an alignment direction of surface alignment of liquid crystal molecules provided by an alignment film formed on an inner surface of the TFT substrate SUB1.

When the linear lamp is disposed along the long side of a transparent substrate, heat from the linear lamp distorts the transparent substrate, and the distorted substrate exerts a birefringent action on light passing through the transparent substrate. FIG. 32 is a schematic for explaining the birefringent action by the transparent heated by the linear lamp. In FIG. 32, only a component of illuminating light L from a backlight (not shown) which is parallel to the polarizing axis POL1S of the polarizer POL1 is transmitted to a transparent substrate SU, and if distortion is caused in the transparent substrate SUB by heat, it produces a birefringent action in the transparent substrate SU, which in turn causes extraordinary rays $L_N$ to emerge from the transparent substrate SUB as well as the ordinary rays $L_O$ having passed through the polarizer POL1.

When the polarizing axis POL2S of the polarizer POL2 is perpendicular to the polarizing axis POL1S of the polarizer POL1, the ordinary rays $L_O$ is blocked by the polarizer POL2, but the extraordinary rays $L_N$ pass through the polarizer POL2. Consequently, if the transparent substrate is distorted, an LCD displays a locally whitish area due to leakage of light through the distorted area of the substrate when the LCD is intended to display a black scene.

FIG. 33 schematically illustrates a display image by the LCD for explaining non-uniformity in a display caused by distortion of their transparent substrates. If a linear lamp LP is disposed along the side of the liquid crystal panel PNL, thermal distortion occurs in a portion of the transparent substrates in the vicinity of the linear lamp LP. When a black scene A is displayed on the screen of the liquid crystal panel PNL, a locally whitish area B is observed due to birefringent action produced in the thermally distorted portion of the substrate as explained in connection with FIG. 32. Such non-uniformity in a display greatly degrades the quality of the display image, and adversely affects performance of the LCD.

SUMMARY OF THE INVENTION

An object of the present invention is to provide an LCD capable of displaying a high quality image by solving the problems with the prior art and preventing non-uniformity in a display caused by heat from a light source of its backlight.

Considering that thermal distortion in the transparent substrates caused by heat from a line light source of the backlight occurs in a direction perpendicular to a longitudinal axis of the line light source, adverse effects of birefringent action are the maximum on the incident light when a linearly polarized light enters the thermally distorted area with its plane of polarization at 45 degrees with respect to the direction of the thermal distortion, and they are minimized when its plane of polarization is parallel to or perpendicular to the direction of the thermal distortion. To accomplish the accomplish the object, in accordance with one embodiment of the present invention, there is provided a liquid crystal display device comprising: a liquid crystal panel including a pair of opposing transparent substrates each having an alignment film on an inner surface thereof, at least one of the transparent substrates having pixel electrodes, on the inner surface thereof, a liquid crystal layer sandwiched between the alignment films, and a pair of polarizers, one of which is disposed in front of the liquid crystal layer and another of which is disposed behind the liquid crystal layer; a driving circuit for supplying voltages to the liquid crystal panel in accordance with display signals; and a backlight having a line light source and disposed behind the liquid crystal panel, wherein each alignment direction of the alignment films is parallel with a polarizing axis of one of the pair of polarizers adjacent thereto, and the polarizing axis of the another of the pair of polarizers is perpendicular to a longitudinal axis of the line light source. In accordance with another embodiment of the present invention there is provided a liquid crystal display device including a liquid crystal panel having a pair of opposing transparent substrates each having an alignment film on an inner surface thereof, at least one of the transparent substrates having pixel electrodes on the inner surface thereof, a liquid crystal layer sandwiched between the alignment films, and a pair of polarizers, one of which is disposed in front of the liquid crystal layer and another of which is disposed behind the liquid crystal layer; a driving circuit for supplying voltages to the liquid crystal panel in, accordance with display signals; and a backlight having a line light source and disposed behind the liquid crystal panel, wherein alignment directions of the alignment films are parallel with each other, an alignment direction of one of the alignment films is parallel with a polarizing axis of one of the polarizers adjacent thereto, and the polarizing axis of the another of the pair of polarizers is perpendicular to a longitudinal axis of the line light source.

BRIEF DESCRIPTION OF THE DRAWINGS

In the accompanying drawings, in which like reference numerals or characters designate similar components throughout the figures, and in which:

FIGS. 2B–2D are plan views of liquid crystal panels for illustrating different arrangement of the polarizing axes and the alignment directions.

FIG. 5 is an exterior view of a notebook personal computer incorporating an LCD of the present invention.

FIGS. 21A and 21B are illustrations of connections of gate terminals and gate wiring lines, FIG. 21A being a plan view thereof and FIG. 21B being a cross sectional view thereof.

FIGS. 22A and 22B are illustrations of connections of drain terminals and video signal lines, FIG. 22A being a plan view thereof and FIG. 22B being a cross sectional view taken along the line XXIIB—XXIIB thereof.

DETAILED DESCRIPTION OF THE PREFERRED EMBODIMENTS

Hereinafter, LCDs according to the present invention will be described in detail by way of preferred embodiments.

Embodiment 1

Figure 1A:
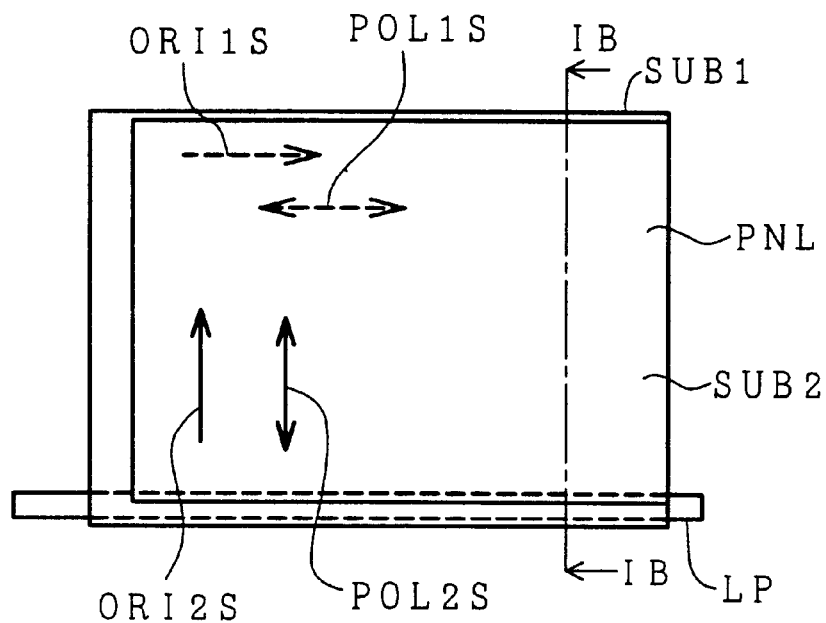
FIGS. 1A and 1B are schematics for explaining relationship among a longitudinal axis of a line light source, polarizing axes of polarizers, alignment directions of alignment films in a first embodiment of the LCD of the present invention, FIG. 1A being a plan view thereof and FIG. 1B being a cross sectional view thereof.
Figure 1B:
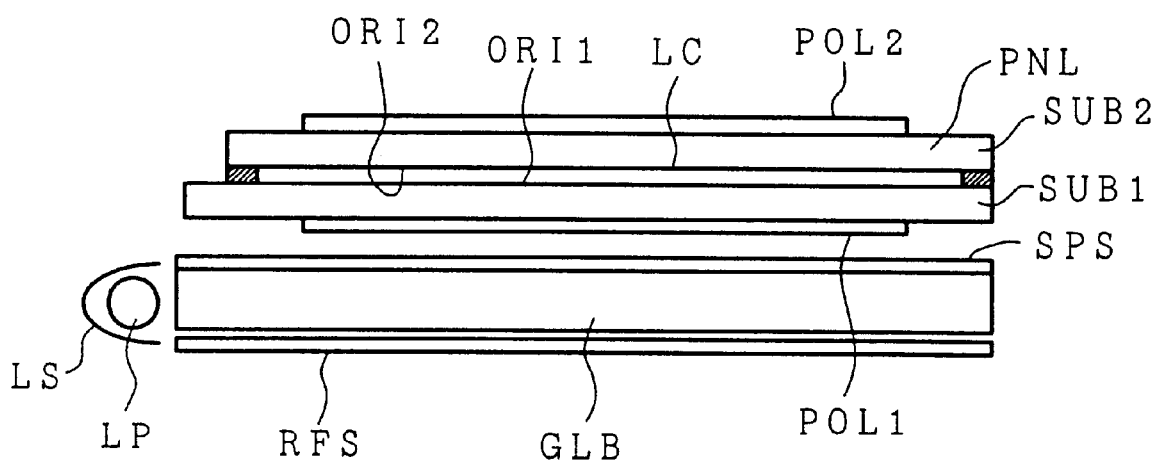

FIGS. 1A and 1B are schematic views of an LCD of a first embodiment of the present invention for explaining the relationship of the longitudinal axis of a line light source, polarizing axes of polarizers and alignment directions of surface alignment of the liquid crystal molecules by alignment films, FIG. 1A being a plan view of the LCD, and FIG. 1B being a cross-sectional view of the LCD taken along line IB—IB of FIG. 1A.

In FIGS. 1A and 1B, reference character SUB1 denotes a TFT substrate, ORI1S is an alignment direction of an alignment film ORI1 formed on an inner surface of the TFT substrate SUB1, POL1S is a polarizing axis of a polarizer POL1 stacked behind the TFT substrate SUB1, SUB2 is a color filter substrate, ORI2S is an alignment direction of an alignment film ORI2 formed on an inner surface of the color filter substrate SUB2, POL2S is a polarizing axis of a polarizer POL2 stacked on the color filter substrate SUB2, and LP is a line light source of a backlight. The longitudinal axis of the line light source LP is arranged in parallel with the alignment direction (rubbing direction) ORI1S of the alignment film ORI1 on the TFT substrate SUB1 and the polarizing axis POL1S of the polarizer POL1 stacked behind the TFT substrate SUB1, and it is also arranged perpendicularly to the alignment direction (rubbing direction) ORI2S of the alignment film ORI2 on the color filter substrate SUB2 and the polarizing axis POL2S of the polarizer POL2 stacked on the color filter substrate SUB2.

With this construction, adverse effects due to the birefringence in the transparent substrates caused by heat from the line light source is suppressed such that a locally whitish area is prevented from appearing in a displayed image when a black scene is displayed.

In FIG. 1B, reference character LC denotes a liquid crystal layer, SPS is a light diffuser, GLB is a light guide, RFS is a reflector and LS is a reflector.

Embodiment 2

This embodiment rotates all of the alignment direction ORI1S of the alignment film ORI1 on the substrate SUB1, the polarizing axis POL1S of the polarizer POL1, the alignment direction ORI2S of the alignment film ORI2 on the substrate SUB2, and the polarizing axis POL2S of the polarizer POL2, through 90 degrees from those corresponding to Embodiment 1.

With this construction also, adverse effects due to the birefringence in the transparent substrates caused by heat from the line light source is suppressed such that a locally whitish area is prevented from appearing in a displayed image when a black scene is displayed.

Figure 2A:
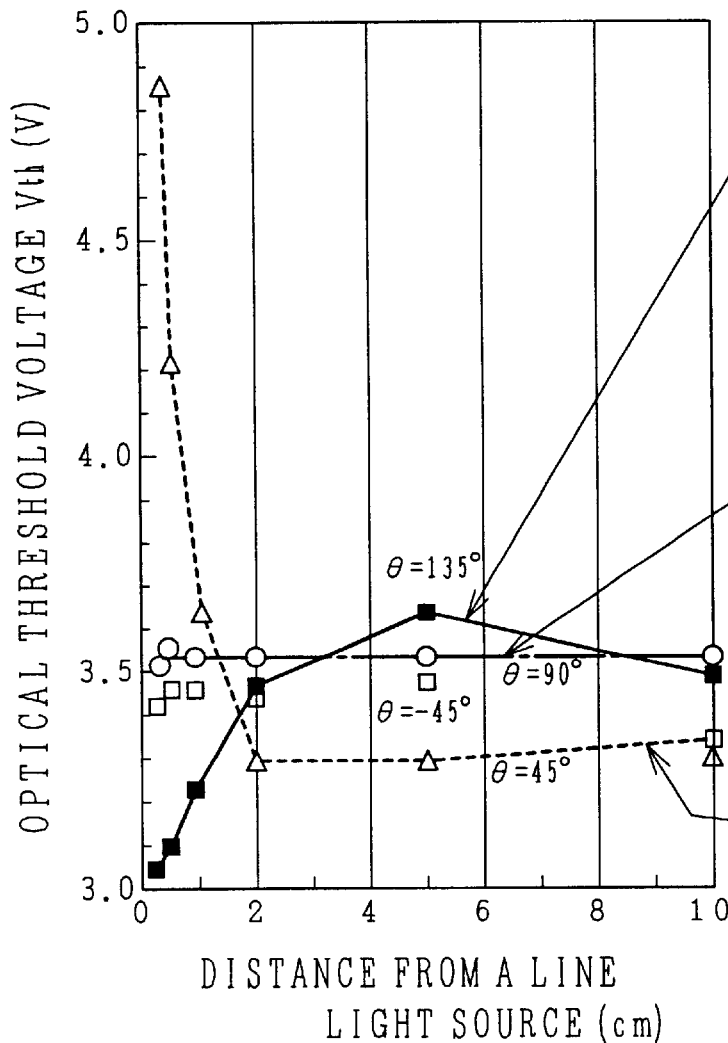
FIGS. 2A–2D are illustrations for effects on optical threshold voltages of angular displacements of polarizing axes of polarizers and alignment directions of alignment films with respect to a longitudinal axis of a line light source, FIG. 2A being optical threshold characteristic of LCDs.
Figure 2D:
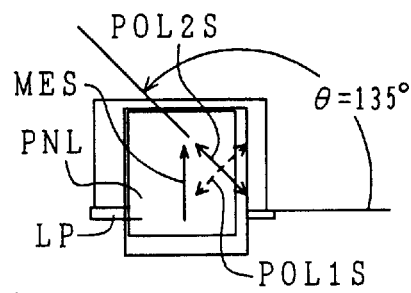
Figure 2C:
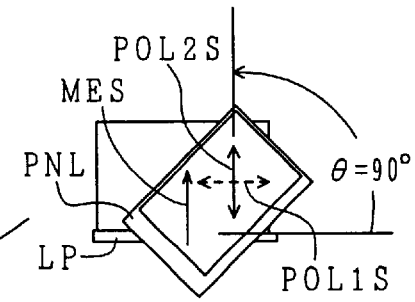
Figure 2B:
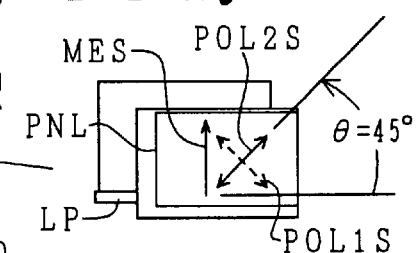

FIGS. 2A and 2B–2D are a graph and illustrations for explaining reduction of variation of optical threshold voltages of the liquid crystal panel PNL in the vicinity of a line light source by the present invention, respectively, and FIG. 2A is a graph showing a relationship between an optical threshold voltage of a liquid crystal panel PNL and a distance of a measurement point from a line light source with an alignment direction of the alignment film varied with respect to the longitudinal axis of the line light source as a parameter. The relationship between the alignment directions and the polarizing axes are fixed. The optical threshold voltage is defined as a voltage across the liquid crystal layer LC to provide 0.7% of peak transmission of the liquid crystal panel PNL which corresponds to a contrast ratio of 143. The alignment direction θ of the alignment film is represented by the polarizing axis POL2S of the polarizer POL2 counterclockwise with respect to the longitudinal axis of the line light source LP as illustrated in FIGS. 2B–2D.

Measurements were made along the line MES on the liquid crystal panel indicated in FIGS. 2B–2D. In this measurement, the TFTs are turned on by d.c. voltages.

Figure 31:
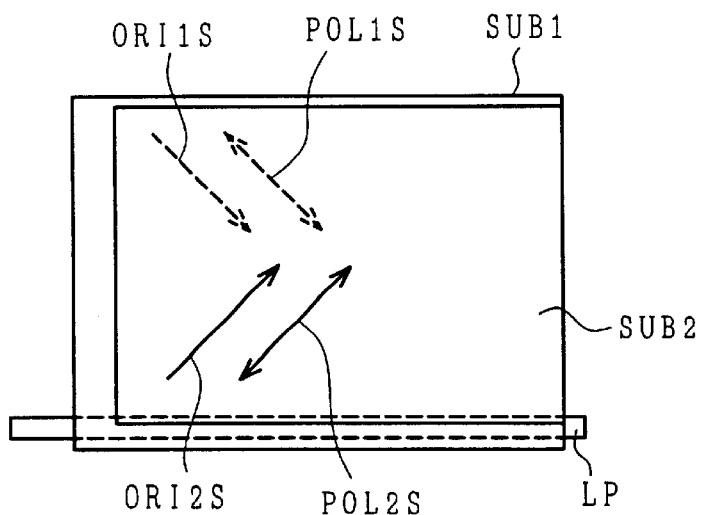
FIG. 31 is an illustration of a relationship between a liquid crystal panel and a line light source of a backlight in a prior art LCD.
Figure 32:
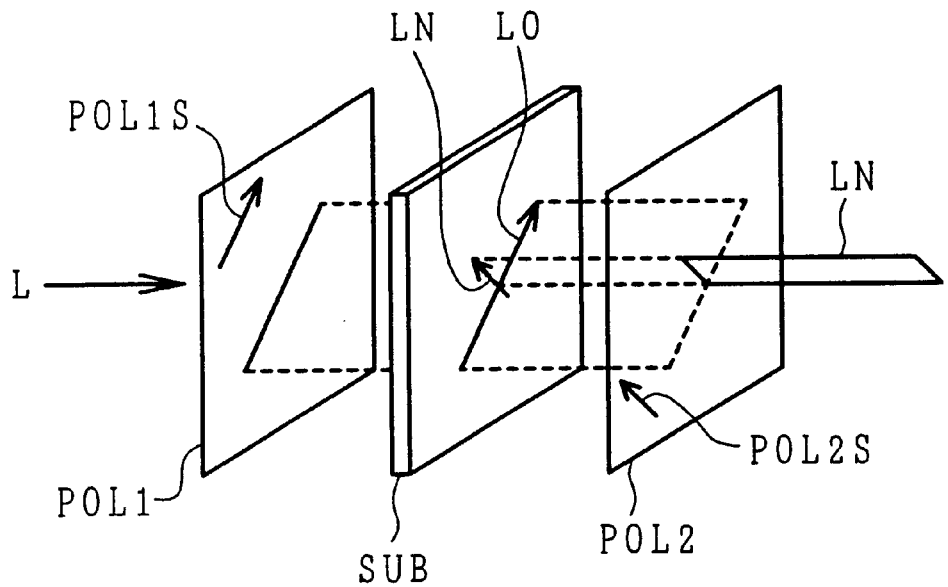
FIG. 32 is a schematic for explaining a birefringent action in a transparent substrate caused by heat from the line light source.
Figure 33:
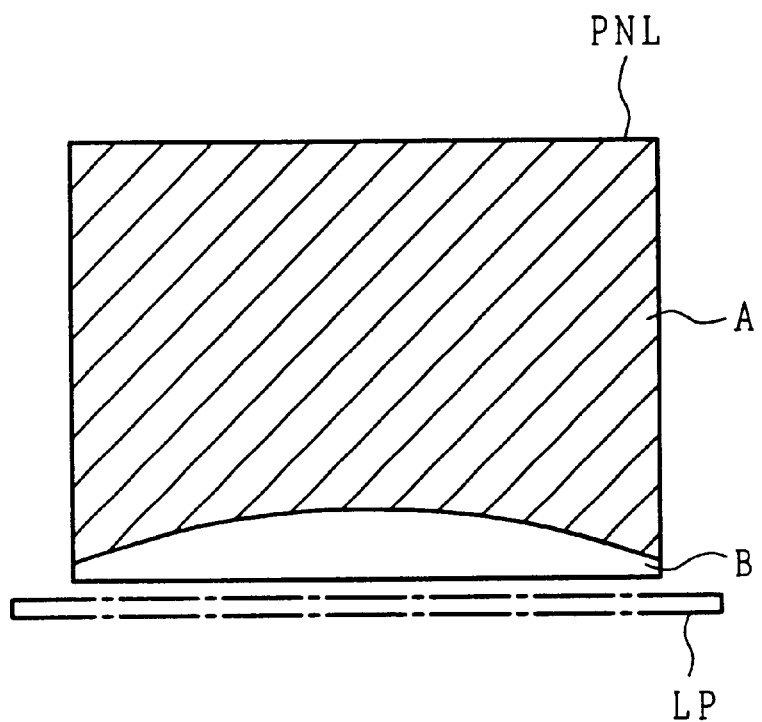
FIG. 33 is a schematic illustration of non-uniformity in a display caused by thermal distortion in the transparent substrate of the prior art LCD.

The arrangement of FIG. 2B corresponds to the prior art LCD shown in FIG. 31, in the arrangement of FIG. 2C the polarizing axis POL2S is rotated through 45 degrees from the arrangement of FIG. 2B, in the arrangement of FIG. 2D the polarizing axis direction POL2S is rotated through 90 degrees from the arrangement of FIG. 2B.

FIG. 2A shows the arrangement of FIG. 2C, that is, the present invention, reduces variation of optical threshold voltages with a distance from the line light source, suppresses the adverse effects of birefringence in the transparent substrates caused by heat from the line light source, and prevents a locally whitish area from appearing in a displayed image when a black scene is displayed.

Embodiment 3

This embodiment applies the present invention to an LCD employing a backlight of the type having a plurality of line light sources disposed behind the useful display area of the liquid crystal panel for illuminating the liquid crystal panel. This type of the backlight is hereinafter referred to as a direct rear illumination type.

Figure 1C:
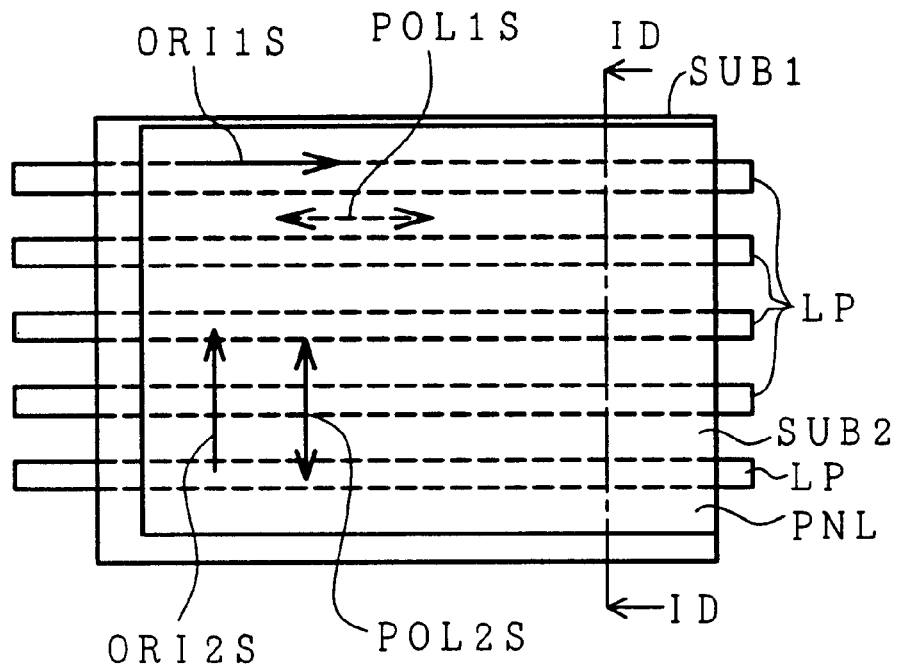
FIGS. 1C and 1D are schematics for explaining relationship among a longitudinal axis of a line light source, polarizing axes of polarizers, alignment directions of alignment films in a third embodiment of the LCD of the present invention, FIG. 1C being a plan view thereof and FIG. 1D being a cross sectional view thereof.
Figure 1D:
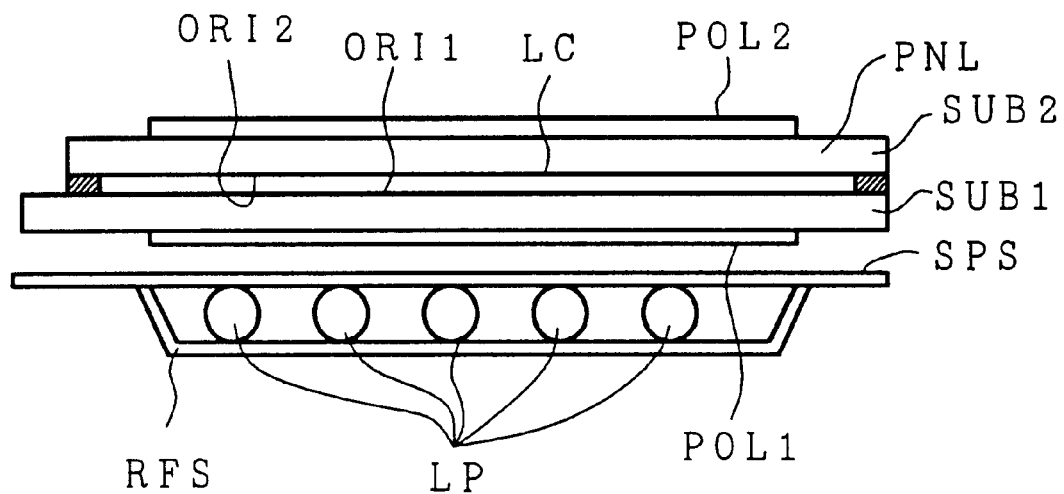

FIGS. 1C and 1D are schematic views of the LCD of this embodiment for explaining the relationship of the longitudinal axes of line light sources, polarizing axes of polarizers and alignment directions of alignment films, FIG. 1C being a plan view of the LCD, and FIG. 1D being a cross-sectional view of the LCD taken along line ID—ID of FIG. 1C.

In FIGS. 1C and 1D, reference character SUB1 denotes a TFT substrate, ORI1S is an alignment direction of an alignment film ORI1 formed on an inner surface of the TFT substrate SUB1, POL1S is a polarizing axis of a polarizer POL1 stacked behind the TFT substrate SUB1, SUB2 is a color filter substrate, ORI2S is an alignment direction of an alignment film ORI2 formed on an inner surface of the color filter substrate SUB2, POL2S is a polarizing axis of a polarizer POL2 stacked on the color filter substrate SUB2.

The backlight comprises a plurality of line light sources LP disposed behind the useful display area of the liquid crystal panel PNL for illuminating the liquid crystal panel PNL, a light diffuser SPS in front of the line light sources LP and a reflector RFS behind the line light sources LP.

The longitudinal axes of the line light sources LP are arranged in parallel with the alignment direction (rubbing direction) ORI1S of the alignment film ORI1 on the TFT substrate SUB1 and the polarizing axis POL1S of the polarizer POL1 stacked behind the TFT substrate SUB1, and they are also arranged perpendicularly to the alignment direction (rubbing direction) ORI2S of the alignment film ORI2 on the color filter substrate SUB2 and the polarizing axis POL2S of the polarizer POL2 stacked on the color filter substrate SUB2.

Thermal distortions occur along the longitudinal axes of the line light sources in the transparent substrates. In this embodiment, by arranging the alignment directions of the two alignment films on the two transparent substrates SUB1 and SUB2 and the polarizing axes of the two polarizers in parallel with and perpendicularly to the longitudinal axes of the line light sources, respectively, non-uniformity in a displayed image is prevented from being caused by birefringent action in the transparent substrates induced by the above-mentioned thermal distortion.

Embodiment 4

This embodiment arranges the polarizing axis POL1S of the polarizer POL1 in parallel with the extending direction of wiring lines for drains or wiring lines for gates of the thin film transistors formed on the transparent substrate SUB1 and also arranges the polarizing axis POL1S and the alignment direction ORI1S of the alignment film ORI1 in parallel with or perpendicularly to the longitudinal axis of the line light source.

Figure 1E:
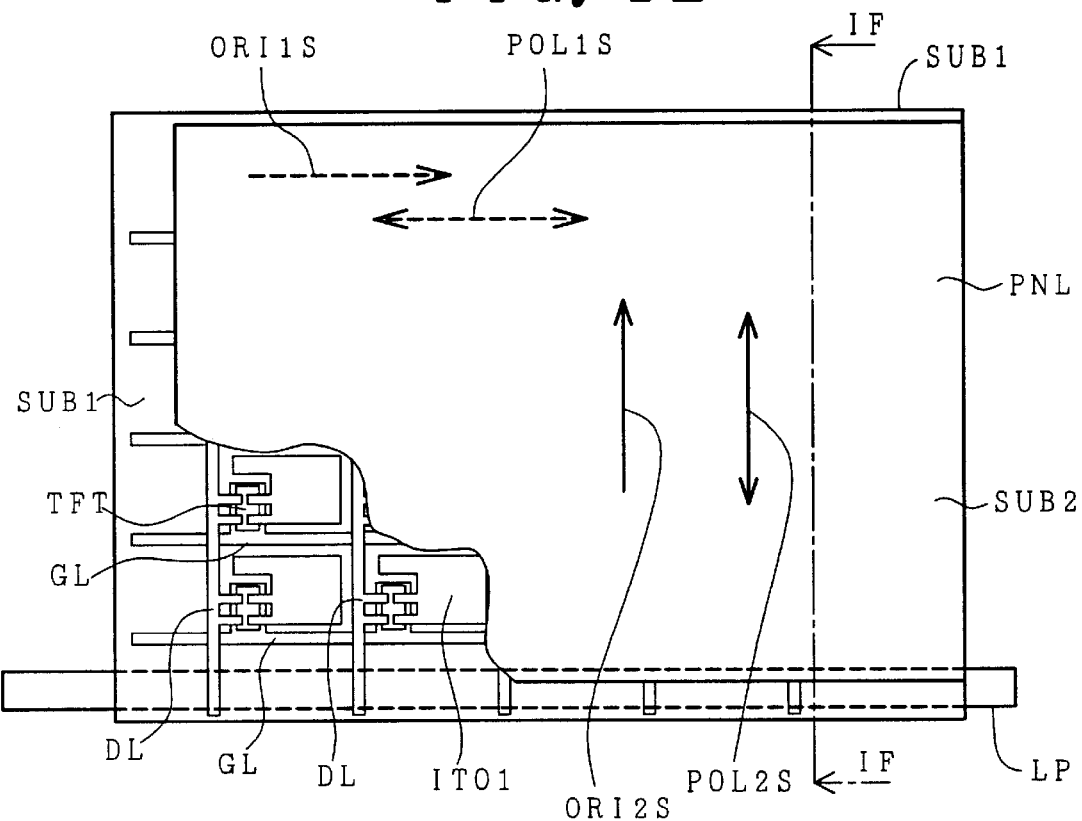
FIGS. 1E and 1F are schematics for explaining relationship among a longitudinal axis of a line light source, polarizing axes of polarizers, alignment directions of alignment films in a fourth embodiment of the LCD of the present invention, FIG. 1E being a plan view thereof and FIG. 1F being a cross sectional view thereof.
Figure 1F:
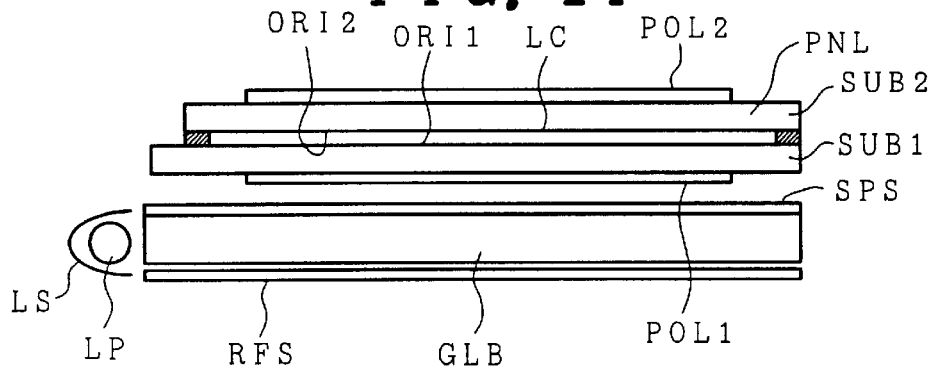

FIGS. 1E and 1F are schematic views of the LCD of this embodiment for explaining the relationship of the longitudinal axes of line light sources, polarizing axes of polarizers and alignment directions of alignment films, and the extending direction of wiring lines for drains and wiring lines for gates of the thin film transistors formed on the transparent substrate SUB1, FIG. 1E being a partially-broken away plan view of the LCD, and FIG. 1F being a cross-sectional view of the LCD taken along line IF—IF of FIG. 1E.

In FIGS. 1E and 1F, reference character SUB1 denotes a TFT substrate, ORI1S is an alignment direction of an alignment film ORI1 formed on an inner surface of the TFT substrate SUB1, POL1S is a polarizing axis of a polarizer POL1 stacked behind the TFT substrate SUB1, SUB2 is a color filter substrate, ORI2S is an alignment direction of an alignment film ORI2 formed on an inner surface of the color filter substrate SUB2, POL2S is a polarizing axis of a polarizer POL2 stacked on the color filter substrate SUB2.

Reference character TFT denotes thin film transistors, DL is wiring lines connected to drain electrodes of the thin film transistors TFT, that is, video signal lines, ITO1 is transparent pixel electrodes connected to source electrodes of the thin film transistors TFT, and GL is wiring lines connected to gate electrodes of the thin film transistors TFT.

In this embodiment, the arrangement of the polarizing axis POL1S of the polarizer POL1 and the alignment direction ORI1S of the alignment film ORI1 in parallel with the extending direction of wiring lines DL, GL for drain or gate electrodes of the thin film transistors TFT formed on the transparent substrate SUB1 reduces the adverse effects of birefringent action perpendicular to the longitudinal axis of the line light source LP.

These embodiments prevent non-uniformity in a displayed image from occurring due to birefringent action induced by thermal distortions in the transparent substrates caused by the line light source.

Embodiment 5

Figure 1G:
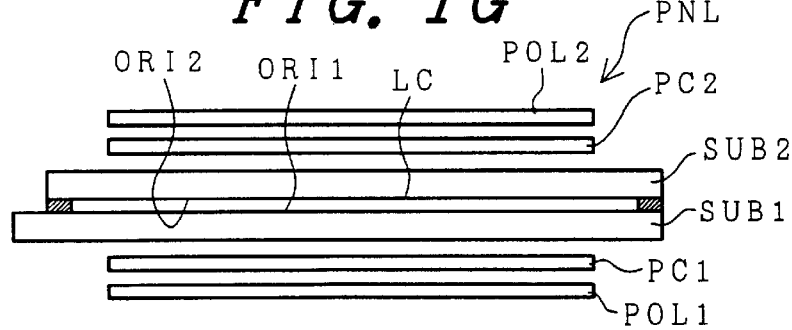
FIG. 1G is a cross sectional view of a fifth embodiment of the LCD of the present invention for explaining an arrangement of optically anisotropic phase compensating films therein.

In all of the Embodiments 1 to 4, the liquid crystal panels PNL are sandwiched directly between a pair of polarizers POL1 and POL2. But the liquid crystal panels PNL in the Embodiments 1 to 4 can be provided with an optically anisotropic phase compensating film PC1, PC2 disposed at least one of between the polarizer POL1 and the liquid crystal panel PNL and between the polarizer POL2 and the liquid crystal panel PNL as illustrated in FIG. 1G which is a cross-sectional view of the liquid crystal panel PNL, for compensating for possible reduced viewing angles or for correcting the possible change of the optimum direction of viewing resulting from the arrangement in which the polarizing axes of the polarizers are in parallel with or perpendicular to the alignment directions of the alignment films.

Phase compensating films for such use are phase compensating film of the type having discotic compound coated with its molecules inclined on an alignment film on a cellulose triacetate substrate reported in "Wide-Viewing-Angle TN-LCD with Novel Optical Compensation Film", Display and Imaging, Vol. 5, pp. 3–9, 1996; NIKKEI MICRODEVICES pp. 167–169, Jan. 1996; NIKKEI ELECTRONICS p. 200, Jan. 15, 1996; and Digest for $21^{st}$ Liquid Conference, in Sendai, Japan, Sep. 27–Sep. 29, 1995, for example.

The phase compensating films for increasing viewing angles can be used also for correcting the shift of the optimum direction of viewing by adjusting angles of the alignment directions of the alignment films on the cellulose triacetate substrates with respect to the alignment directions of the alignment films of the liquid crystal panel PNL.

Next, an LCD to which the present invention is applied will be explained in detail with reference to the accompanying drawings.

Figure 3:
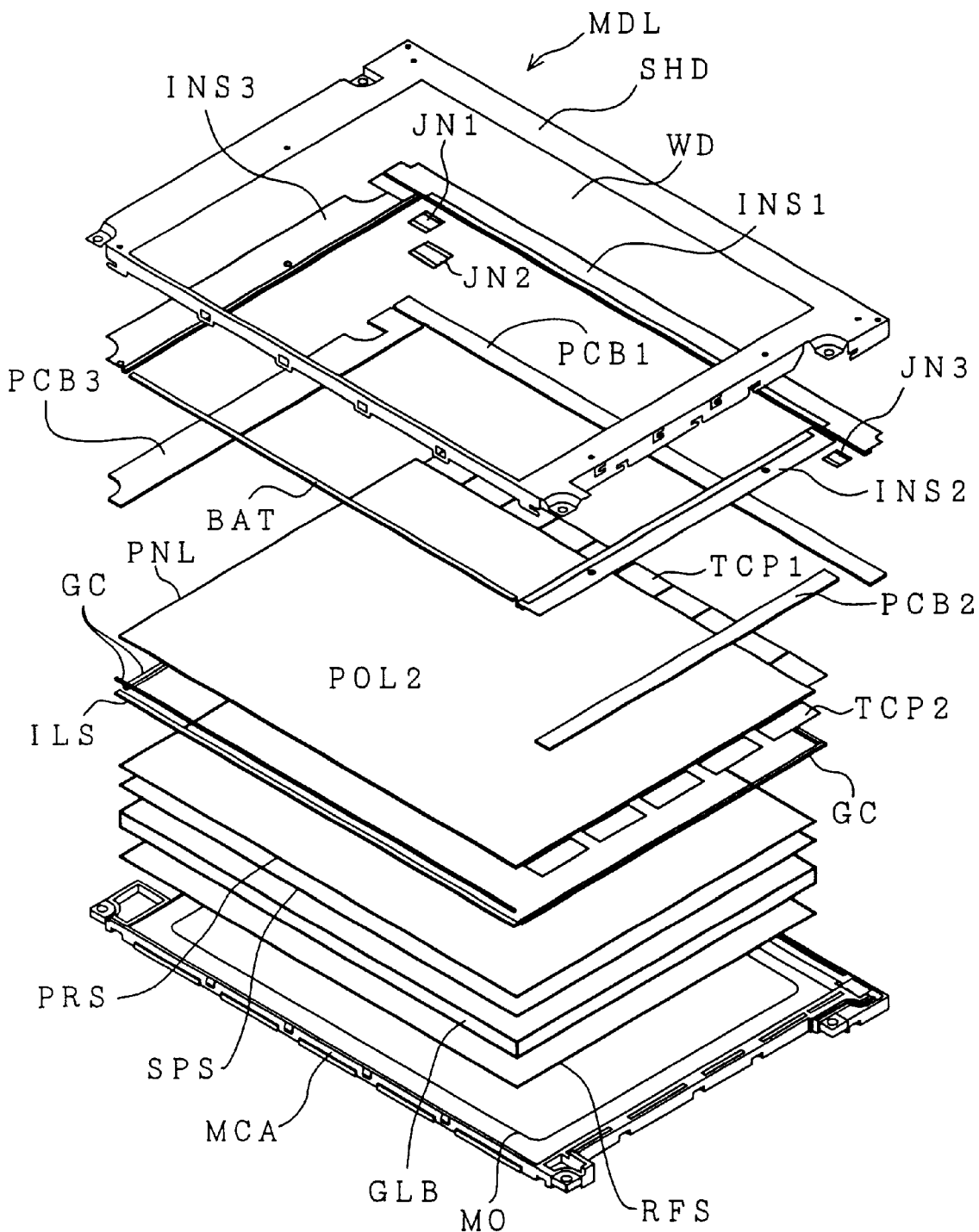
FIG. 3 is an exploded perspective view of an LCD for explaining components of a liquid crystal display module in an LCD of the present invention.

FIG. 3 is an exploded perspective view of a liquid crystal display module of an LCD according to the present invention for illustrating its components. Reference character SHD denotes an upper frame, WD is its display window, PNL is a liquid crystal panel, SPS is a light diffuser, GLB is a light guide, RFS is a reflector, BL is a backlight, MCA is a lower frame. These components are stacked and assembled to form a module MDL as illustrated in FIG. 3.

In the liquid crystal module MDL, the upper frame SHD and the lower frame MCA sandwich and fix the other components therebetween by hooking claws provided in the upper frame SHD at the lower frame MCA.

In the peripheral portions of the upper frame SHD, driving circuit boards (gate driving circuit board and drain driving circuit board) PCB1, PCB2, and an interface circuit board PCB3 are connected therebetween or to the liquid crystal panel PNL by tape carrier pads TCP1, TCP2 or joiners JN1, JN2, JN3.

The lower frame MCA is formed with such an opening MO to house therein the light diffusing sheet SPS, the light guide GLB and the light reflector RFS of the backlight BL. In FIG. 3, the line light source is omitted which is positioned at sides of the light guide GLB. The light emitted from the line light source is projected toward the liquid crystal panel PNL by the light guide GLB, the reflector RFS and the light diffusing sheet SPS to illuminate the display screen of the liquid crystal panel PNL uniformly. A reflecting sheet LS is provided to the line light source LP (see FIGS. 1B and 1F). A prismatic sheet PRS is interposed between the backlight BL and the liquid crystal panel PNL with light-blocking spacers ILS around it to adjust the directions of the illuminating light.

Reference characters INS1, INS2 and INS3 denote insulating sheets, GC is a rubber cushion, and POL2 is an upper polarizer.

FIGS. 4A–4E illustrate the construction of the liquid crystal module MDL formed by integrally assembling the liquid crystal panel PNL and the backlight BL with the upper frame SHD and the lower frame MCA, FIG. 4A being a plan view of the display area of the liquid crystal module MDL, FIG. 4B being its left-hand side view, FIG. 4C being its right-hand side view, FIG. 4D being its top side view and FIG. 4E being a bottom side view.

Reference character SHD denotes the upper frame, AR is a display area, MCA is the lower frame, HD1–HD4 are fixing holes, LCT is a connector, LPC1 is a lamp cable, CT1 is an interface connector and WD is the display window. The upper polarizer POL2 is attached to cover the top surface of the liquid crystal panel PNL.

The LCD is fixed in a display section of an information processing equipment such as a notebook personal computer or a monitor by using the upper frame SHD and the lower frame MCA via fixing holes HD1–HD4.

An inverter circuit for the backlight is positioned in a recess between the fixing holes HLD1 and HLD2, a power for the line light source (a cold cathode fluorescent lamp) of the backlight is supplied via the connector LCT and the lamp cable LPC1.

In this embodiment, the fluorescent lamp is positioned at the bottom side of and behind the liquid crystal panel PNL.

Signals and power supplies from a host computer are provided via the interface connector CT1 disposed behind the liquid crystal panel PNL.

Figure 4:
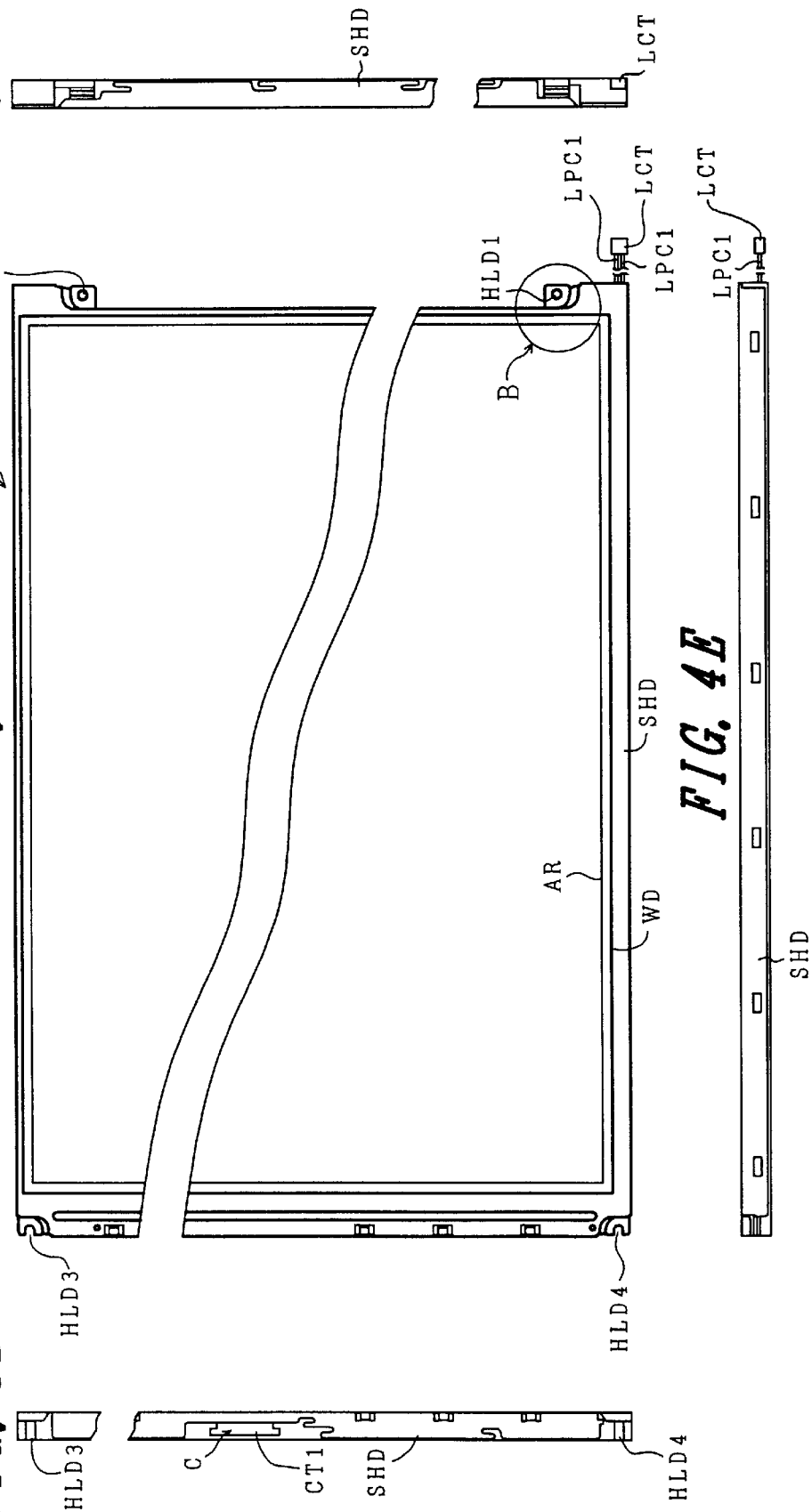
FIGS. 4A–4E are illustrations of the liquid crystal module of FIG. 3 which is an integral assembly of an liquid crystal panel and a backlight sandwiched between an upper frame and a lower frame, FIG. 4A being a plan view of a display screen thereof, FIG. 4B being a left-hand side view, FIG. 4C being a right-hand side view, FIG. 4D being a top side view and FIG. 4E being a bottom side view.

The LCD of FIGS. 3 and 4 has a large outside dimensions and an increased display area AR, and a small non-useful area in the periphery of the display area. This LCD is also made lighter in weight and provides a large and easy-to-view display without sacrificing transportability of transportable information processing equipment.

FIG. 5 is a perspective view of a notebook personal computer for explaining an example of equipment installing an LCD of the present invention. The notebook personal computer which is transportable comprises a keyboard section (a main section) and a display section connected to the keyboard section by hinges. The keyboard section houses a keyboard, a host computer and signal generating circuits such as a central processing unit (CPU), and a case CSE of the display section houses the liquid crystal panel PNL, a printed circuit board PCB around the liquid crystal panel PNL for mounting thereon the driving circuit boards FPC1, FPC2, a control chip TCON, and an inverter power board IV which is a power supply for the backlight.

The liquid crystal module MDL comprised of an integral assembly of the liquid crystal display panel PNL, the circuit boards FPC1, FPC2, PCB, the inverter power supply board IV and the backlight BL can employ one of the structures in the above-described embodiments and is installed in the display section.

Next, a color active-matrix addressing type LCD in accordance with the present invention will be explained in detail.

Figure 6:
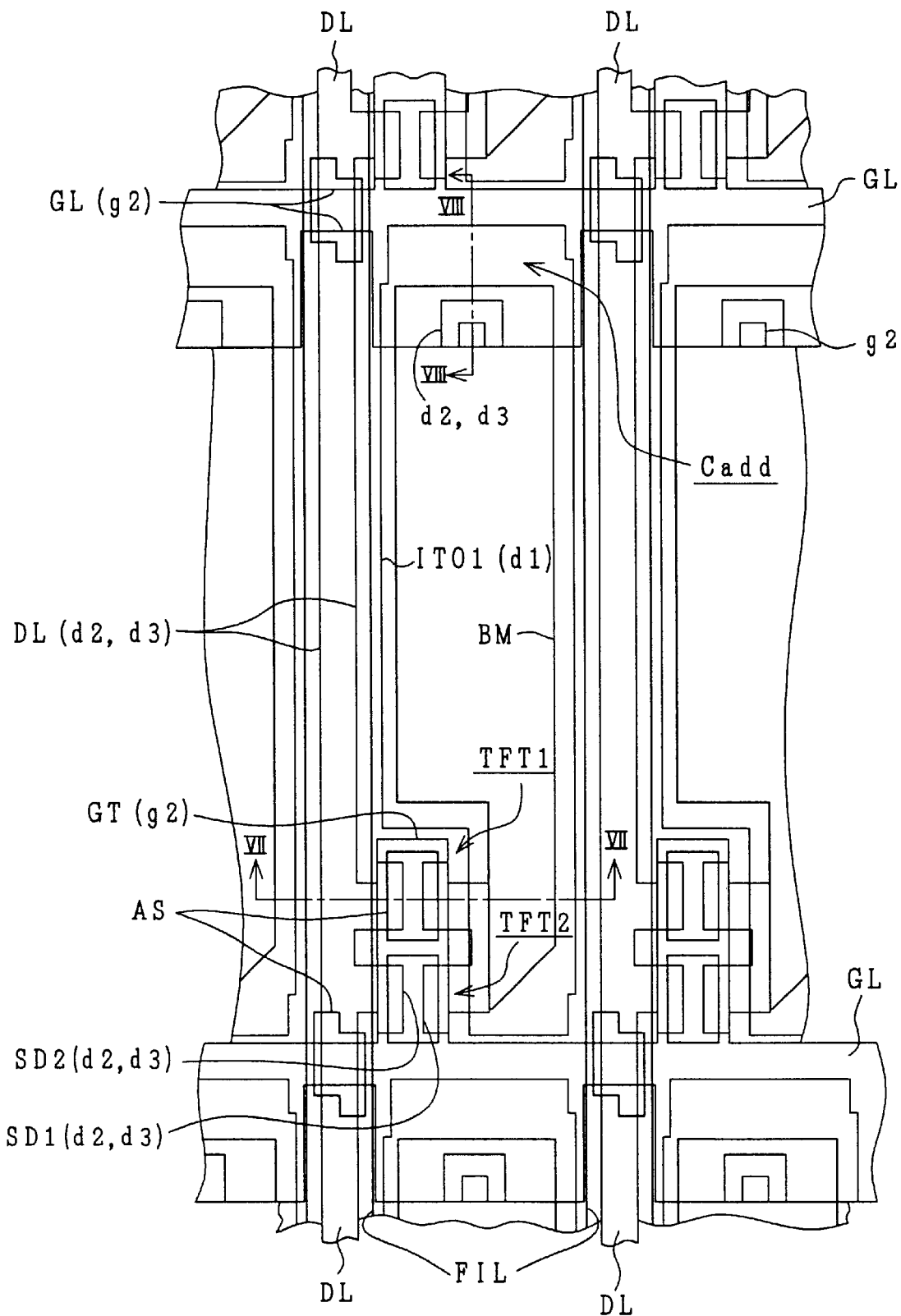
FIG. 6 is a plan view of a picture element, a light-blocking area by a black matrix therefor and their vicinity in a twisted nematic and active matrix addressing type color LCD in accordance with the present invention.
Figure 7:
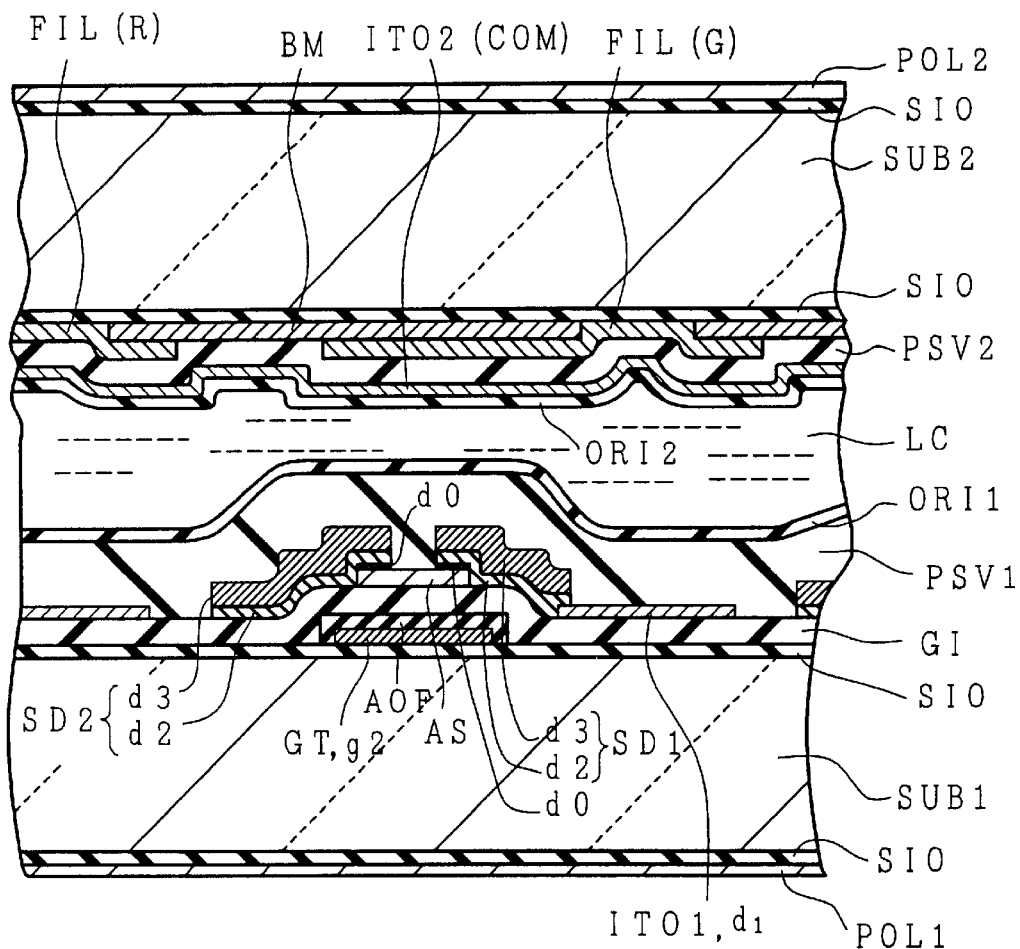
FIG. 7 is a cross sectional view of a picture cell and its vicinity taken along the line VII—VII of FIG. 6.
Figure 8:
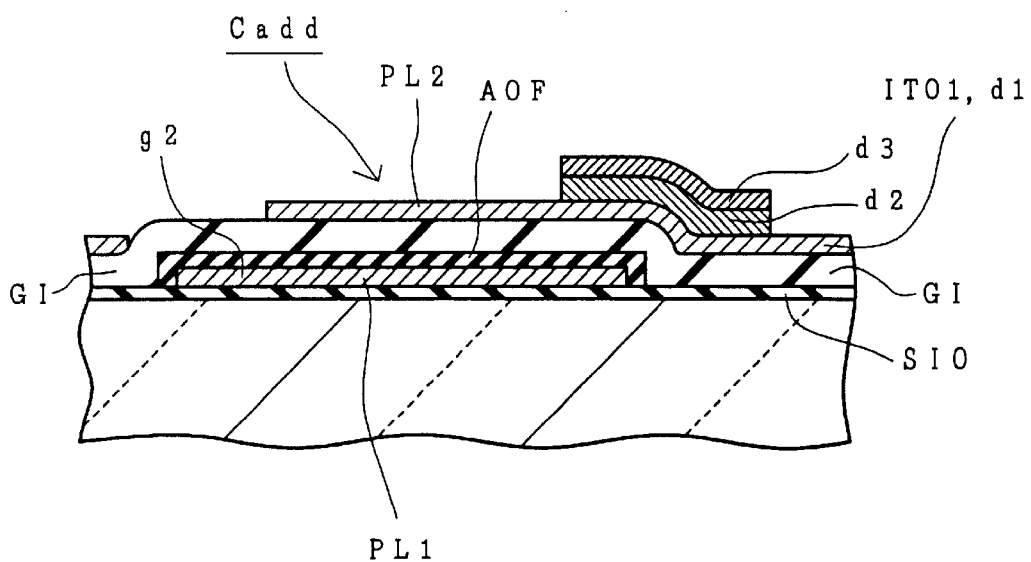
FIG. 8 is a cross sectional view of an additional capacitor Cadd taken along the line VIII–VIII of FIG. 6.
Figure 9:
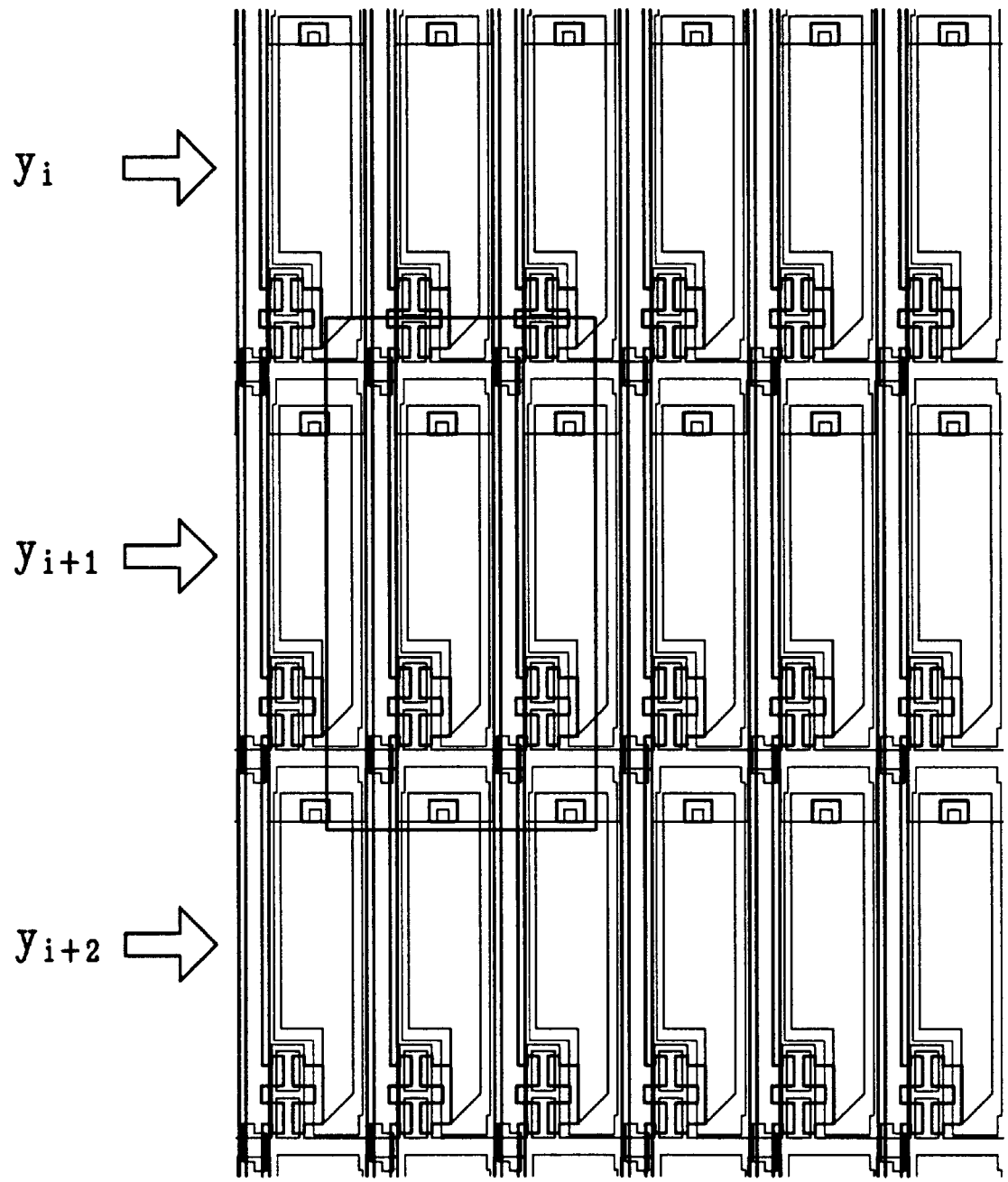
FIG. 9 is a plan view of a major portion of a display screen comprising a plurality of picture elements illustrated in FIG. 6.

FIG. 6 is a plan view of a picture element and its vicinity in a twisted nematic and active matrix addressing type color LCD in accordance with the present invention, FIG. 7 is a cross sectional view of a picture cell and its vicinity taken along the line VII—VII of FIG. 6, FIG. 8 is a cross sectional view taken along the line VIII—VIII of FIG. 6, and FIG. 9 is a plan view of a display screen comprising a plurality of picture elements illustrated in FIG. 6.

As shown in FIG. 6, each picture element (hereinafter pixel) is arranged in an area defined by two adjacent scanning signal lines GL (also referred to as gate signal lines or horizontal signal lines) and two adjacent video signal lines DL (also referred to as drain signal lines or vertical signal lines).

Each pixel includes two thin film transistors TFT1, TFT2, a transparent pixel electrode ITO1 and a holding capacitor Cadd. The scanning signal lines GL extend in a direction of rows and are arranged plurally in a direction of columns. The video signal lines DL extend in a direction of columns and are arranged plurally in a direction of rows.

As shown in FIG. 7, on a lower transparent glass substrate SUB1 which is placed behind an liquid crystal layer LC, a thin film transistor TFT and a transparent pixel electrode ITO1 are formed, and on an upper transparent glass substrate SUB2 a color filter FIL, and a light-blocking black matrix pattern BM are formed.

The upper and lower transparent glass substrates SUB1, SUB2 are 1.1 mm in thickness, for example, and are coated with silicon oxide films SIO on both sides thereof by dip treatment. Even if fine cuts or scratches are present in the surfaces of the transparent glass substrates SUB1, SUB2, the silicon oxide films SIO make the surfaces planar such that the quality of the scanning signal lines GL and the black mask pattern BM formed on the silicon oxide films SIO are made uniform over the substrates.

The light-blocking layer (hereinafter a black matrix) BM, color filters FIL, and an upper alignment film ORI2 are formed in this order on the inner surface of the upper transparent glass substrate SUB2 on the liquid crystal layer LC side thereof.

Peripheral Portions Around a Matrix Area

Figure 10:
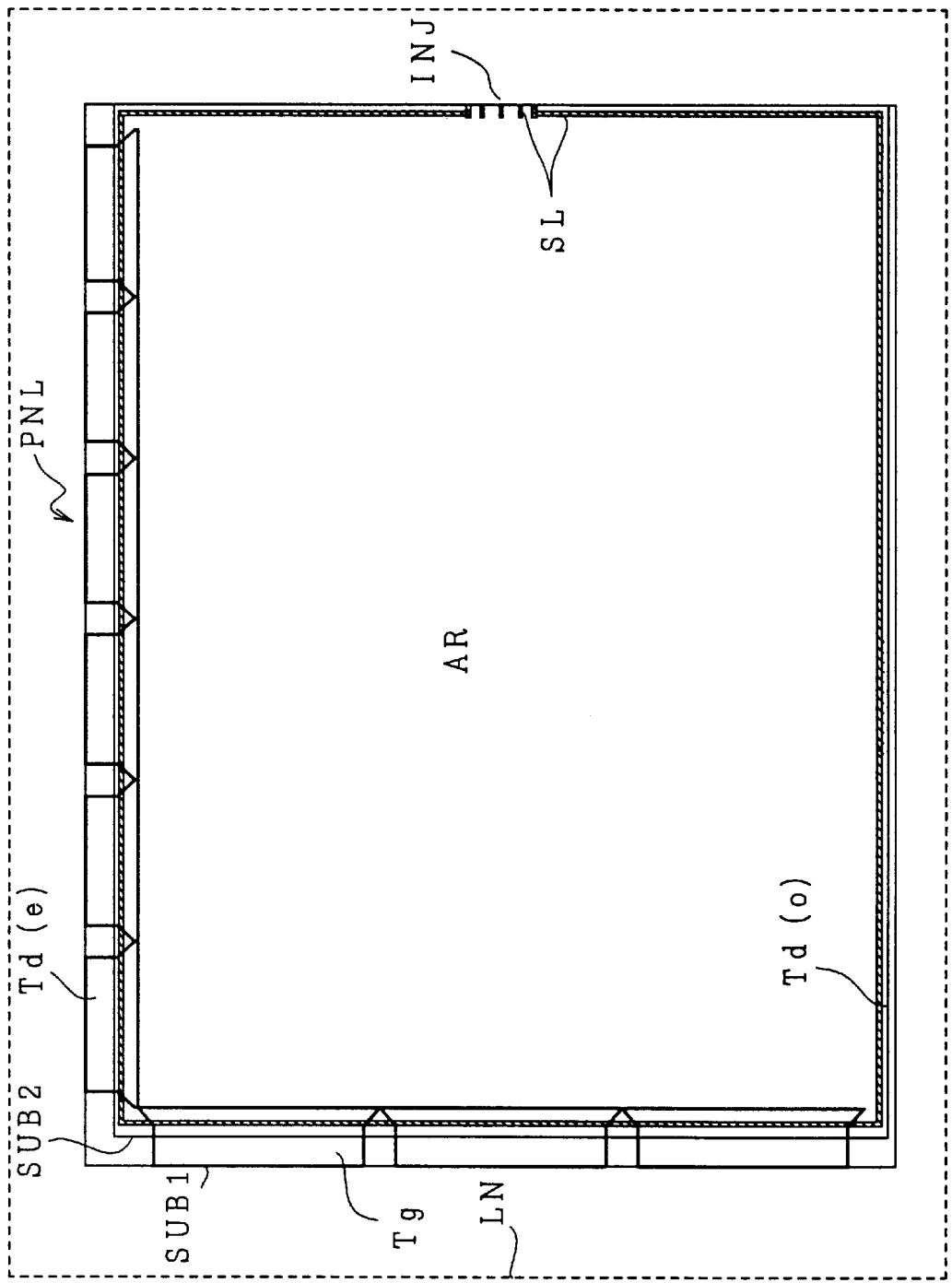
FIG. 10 is a plan view of a display panel for explaining a structure of its peripheral portions around a matrix therein.
Figure 11:
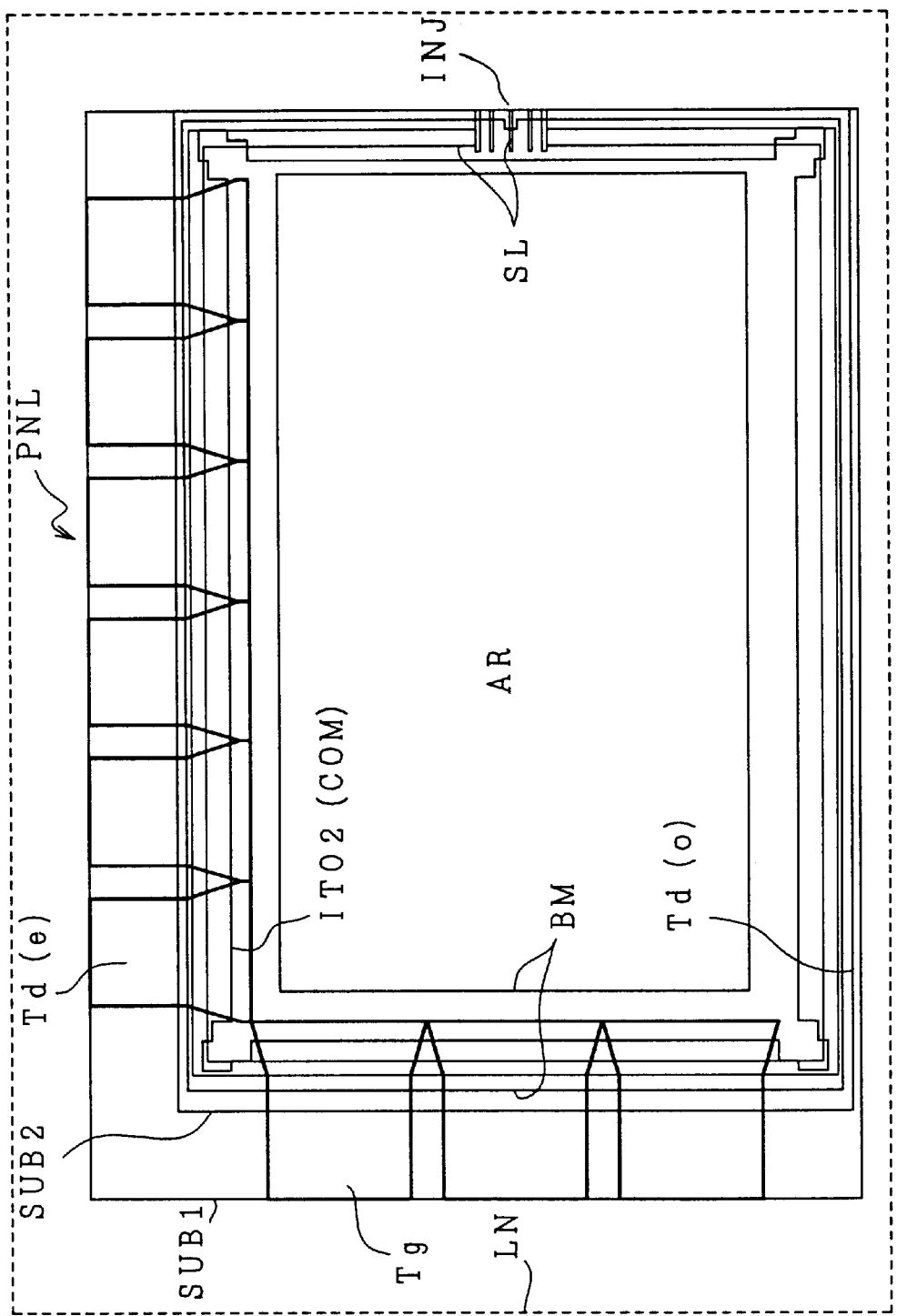
FIG. 11 is a plan view, somewhat exaggerated, of the peripheral portions of FIG. 10 for explaining them concretely.
Figure 12:
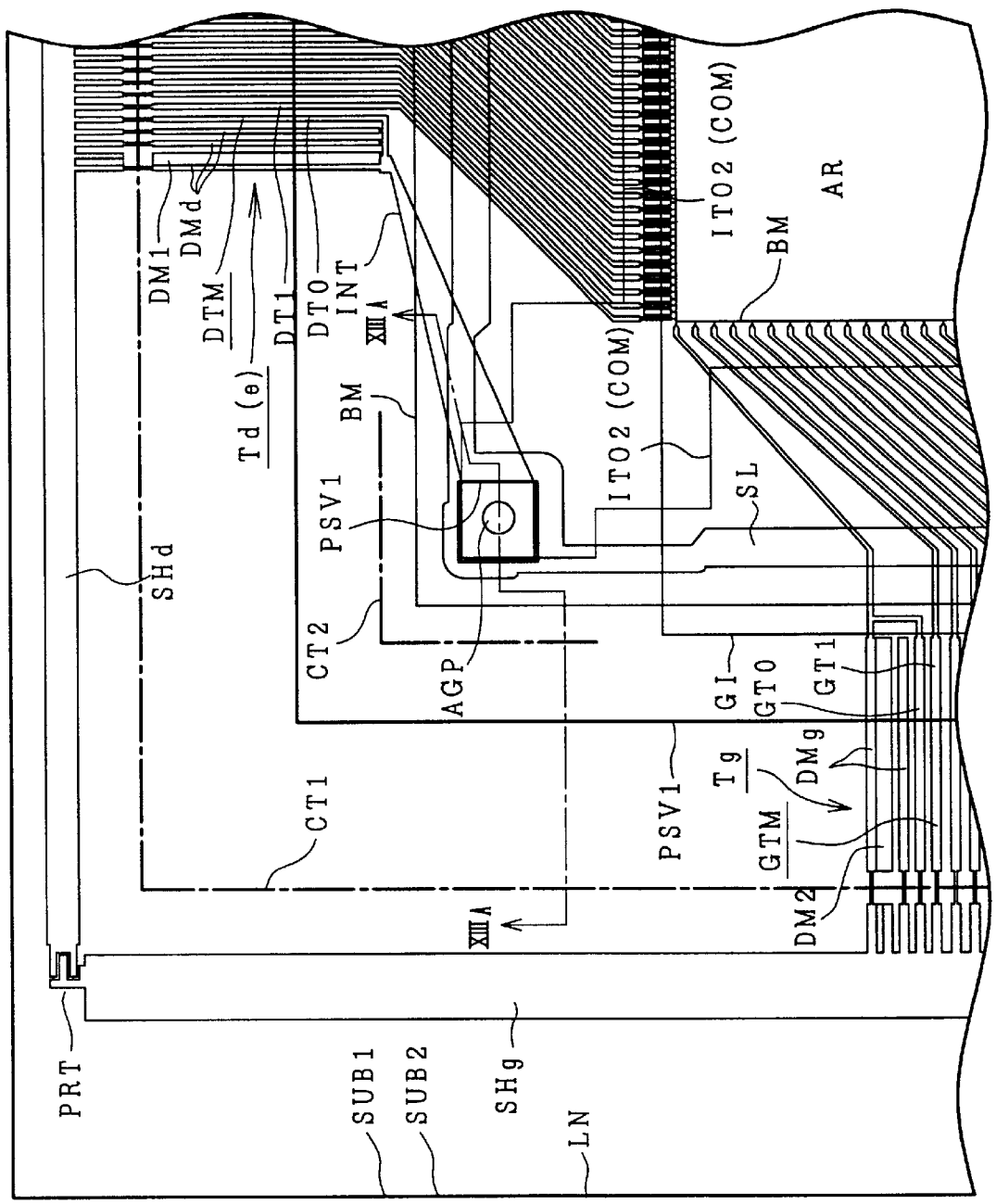
FIG. 12 is an enlarged plan view of a corner of the liquid crystal panel including electrical connections between the upper and lower transparent substrates.
Figure 13:
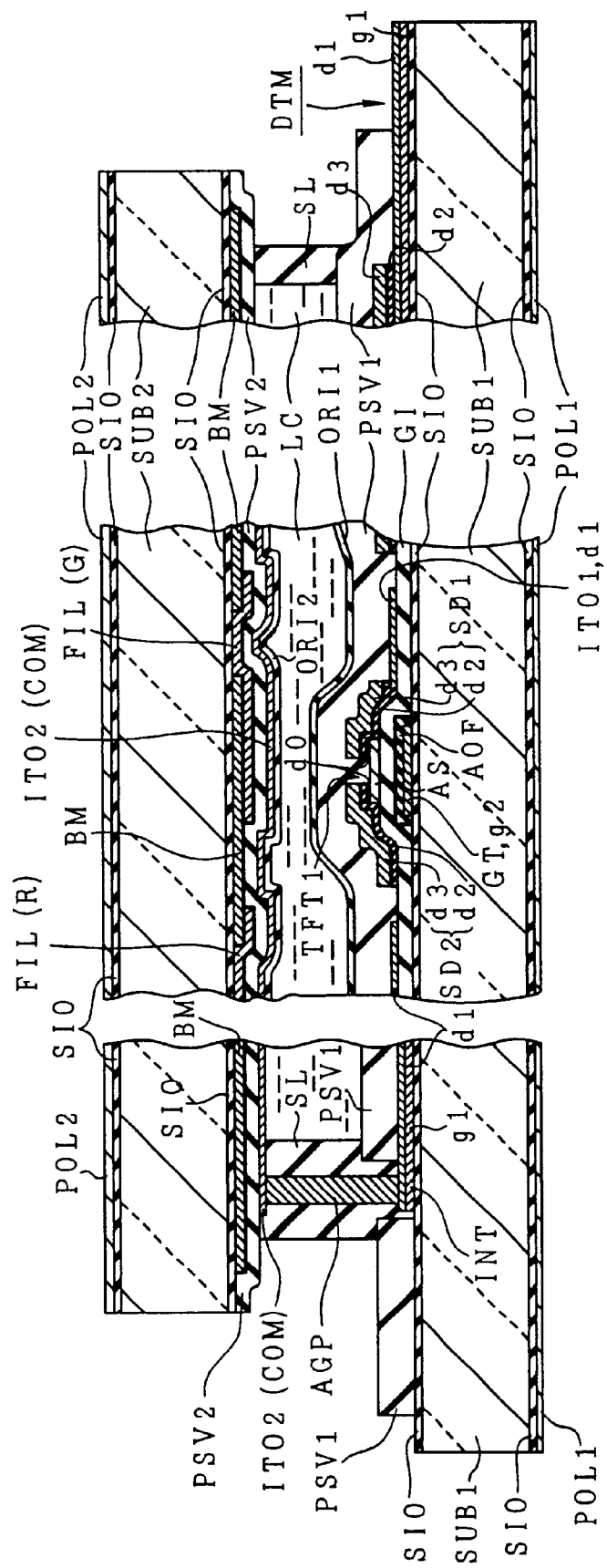
FIGS. 13A, 13B and 13C are cross sectional views of a corner portion, a picture element in a matrix portion and a video terminal portion of the liquid crystal panel, respectively.
Figure 14:
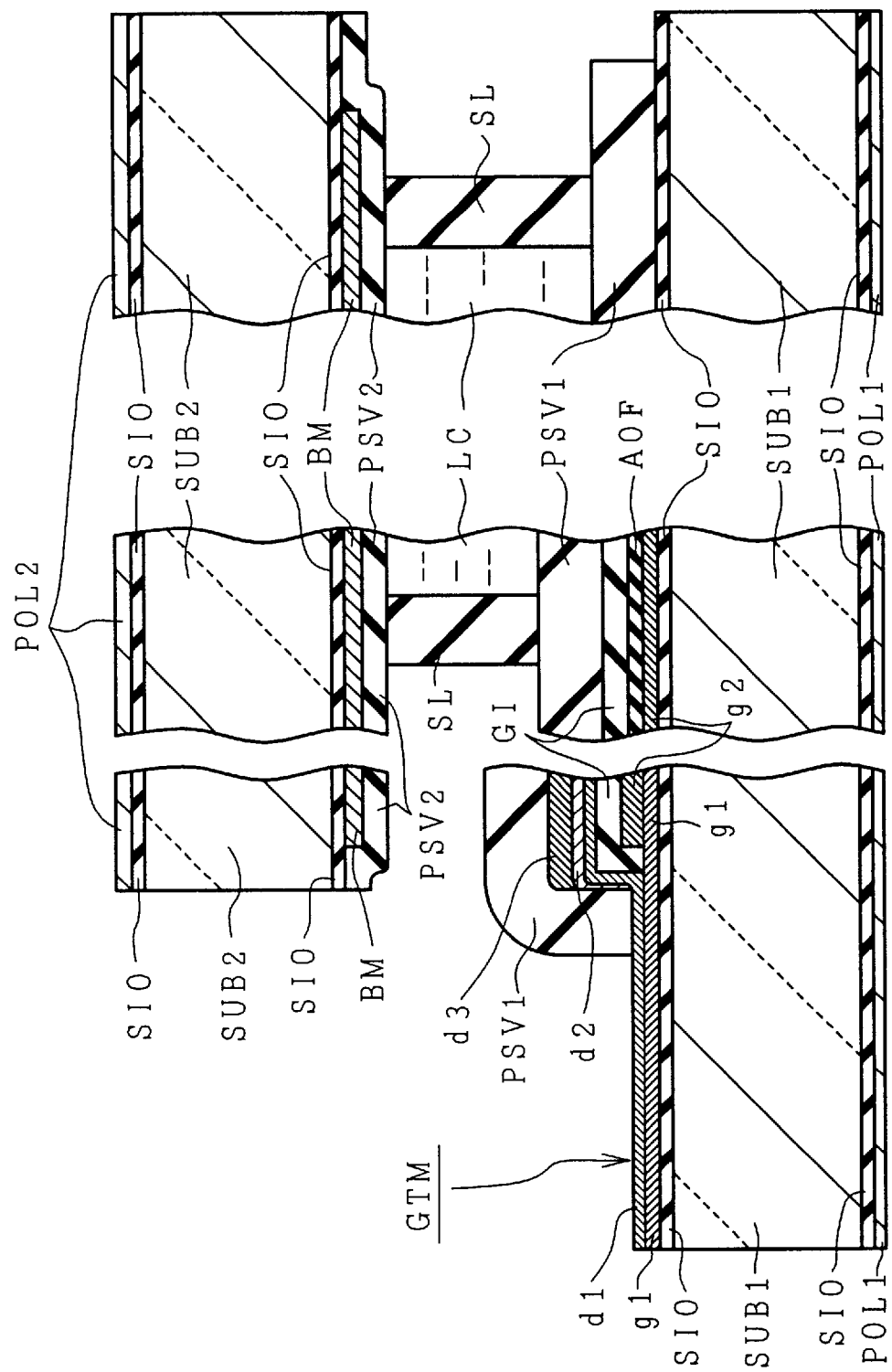
FIG. 14A is a cross sectional view of a scanning signal terminal.
FIG. 14B is a cross sectional view of a peripheral portion of the liquid crystal panel in which no external electrical terminals are disposed.

FIG. 10 is a plan view of a major portion of peripheral portions around a matrix area AR of the liquid crystal panel PNL comprising the upper and lower transparent glass substrates SUB1, SUB2, FIG. 11 is a plan view, further exaggerated, of the peripheral portions of FIG. 10, and FIG. 12 is an enlarged plan view of a sealing area SL of an upper left-hand side corner of the liquid crystal panel of FIGS. 10, 11. FIG. 13A is a cross sectional view taken along the line XIIIA—XIIIA of FIG. 12, FIG. 13B is a cross sectional view similar to FIG. 7, taken along the line VII—VII of FIG. 6, FIG. 13C is a cross sectional view of a portions in the vicinity of external terminals DTM to be connected to video signal line driver circuits, FIG. 14A is a cross sectional view of a portion in the vicinity of external terminals GTM to be connected to scanning signal circuits, and FIG. 14B is a cross sectional view of a peripheral portion of the liquid crystal panel near a sealing border in which no external electrical terminals are disposed.

In fabrication of liquid crystal panels, if their display screen size is small, a single plate glass having a pattern equivalent to a plurality of liquid crystal panels is processed and is divided into a plurality of liquid crystal panels to improve throughput, and if their display screen is large, a plate glass of standardized size is used regardless of different sizes to share manufacturing equipment and is cut to a desired size according to its specification by cutting away scraps after completion of required processing.

FIGS. 10–12 illustrate the latter case of the two. FIGS. 10 and 11 illustrates the upper and lower glass substrates SUB1, SUB2 cut to final sizes, and in FIGS. 10 and 11 broken lines LN denote the outside dimensions of the standardized plate glass. FIG. 12 illustrates the plate glass before being cut to a final size, in FIG. 12 a solid line LN denotes the outside dimension of the standardized plate glass and dot-dash lines CT1 and CT2 denote cutoff lines for the substrates SUB1 and SUB2, respectively.

In the completed liquid crystal panel in either case, the upper glass substrate SUB2 is set back from the edges of the lower substrate SUB1 in peripheral portions of the substrate SUB1 (the top side, the bottom side and the left-hand side in FIGS. 10 and 11) provided with the external connection terminal groups Tg and Td (suffixes omitted) to expose the external connection terminal groups Tg and Td.

An external connection terminal group Tg means a group comprising terminals GTM for scanning circuits to be described later and wiring lines therefor belonging to one tape carrier package TCP mounting an IC CHI, and an external connection terminal group Td means a group comprising terminals DTM for video signal circuits to be described later and wiring lines therefor for one tape carrier package TCP mounting an IC CHI (see FIGS. 15 and 16). In each external connection terminal group, the wiring lines going from the matrix area to the external terminals are inclined at progressively larger angles as one goes away from the center line of the group such that the pitches of the terminals DTM and GTM of the liquid crystal panel PNL match the arrangement pitch of the tape carrier packages TCP and the pitches of connection terminals of each tape carrier package TCP.

A sealing pattern SL (also referred to as a sealing member) is interposed between the transparent glass substrates SUB1 and SUB2 along the four sides thereof to enclose liquid crystal LC except for a hole INJ for injecting the liquid crystal LC. The sealing pattern SL is made of epoxy resin, for example. The common transparent electrode IT02 on the upper transparent glass substrate SUB2 is connected to a lead-in line INT formed on the lower transparent substrate SUB1 at least one place, in this embodiment at the four corners of the liquid crystal panel PNL, by means of silver paste AGP. These lead-in lines INT are formed in the same process steps as for the gate terminals GTM and the drain terminals DTM to be described later.

The alignment films ORI1, ORI2, the transparent pixel electrodes ITO1, the common transparent electrode ITO2 are disposed within the sealing pattern SL. The polarizers POL1, POL2 are attached to the outer surfaces of the lower transparent glass substrate SUBS and the upper transparent glass substrate SUB2, respectively.

The liquid crystal LC is enclosed between the lower alignment film ORI1 and the upper alignment film ORI2 for aligning liquid crystal molecules in the space defined by the seal pattern SL.

The lower alignment film ORI1 is formed on the protective layer PSV1 on the lower transparent glass substrate SUB1.

This liquid crystal panel is fabricated by depositing various films on the lower transparent glass substrate SUB1 and the upper transparent glass substrate SUB2 in separate processes, then forming the sealing pattern SL on the upper transparent glass substrate SUB2, then overlapping the substrates SUB2 and SUB1 one on another with the sealing pattern interposed therebetween, then injecting the liquid crystal into the space between the two substrates SUB2, SUB1 via the injection hole INJ in the sealing pattern SL, then sealing off the injection hole INJ by epoxy resin, for example, and then completing a liquid crystal panel by cutting the two substrates SUB2, SUB1 to desired sizes.

Thin Film Transistor TFT

The TFT functions such that, if a positive bias is applied to the gate electrode GT, the channel resistance between the source and the drain decrease, and if the bias is made zero, the channel resistance increases.

The thin film transistor TFT of each pixel is divided into two (or more) transistor parts, TFT1 and TFT2. These thin film transistors TFT1 and TFT2 are substantially identical in size (the channel length and channel width). These divided thin film transistors TFT1 and TFT2 have a continuous gate electrode GT, a continuous gate insulating film GI, a continuous i-type (intrinsic type, i.e., not doped with a conductivity type determining impurity) amorphous Si semiconductor layer AS, and a pair of separate source electrodes SD1 and a pair of separate drain electrodes SD2. Incidentally, the source and drain are intrinsically determined by the polarity of a bias voltage therebetween, and this polarity is inverted during the operation of the LCD.

It is to be noted that the source and drain are interchanged during the operation of the LCD, but in this specification for convenience a given one is always referred to as the source and the other is always referred to as the drain.

Gate Electrode GT

Figure 17:
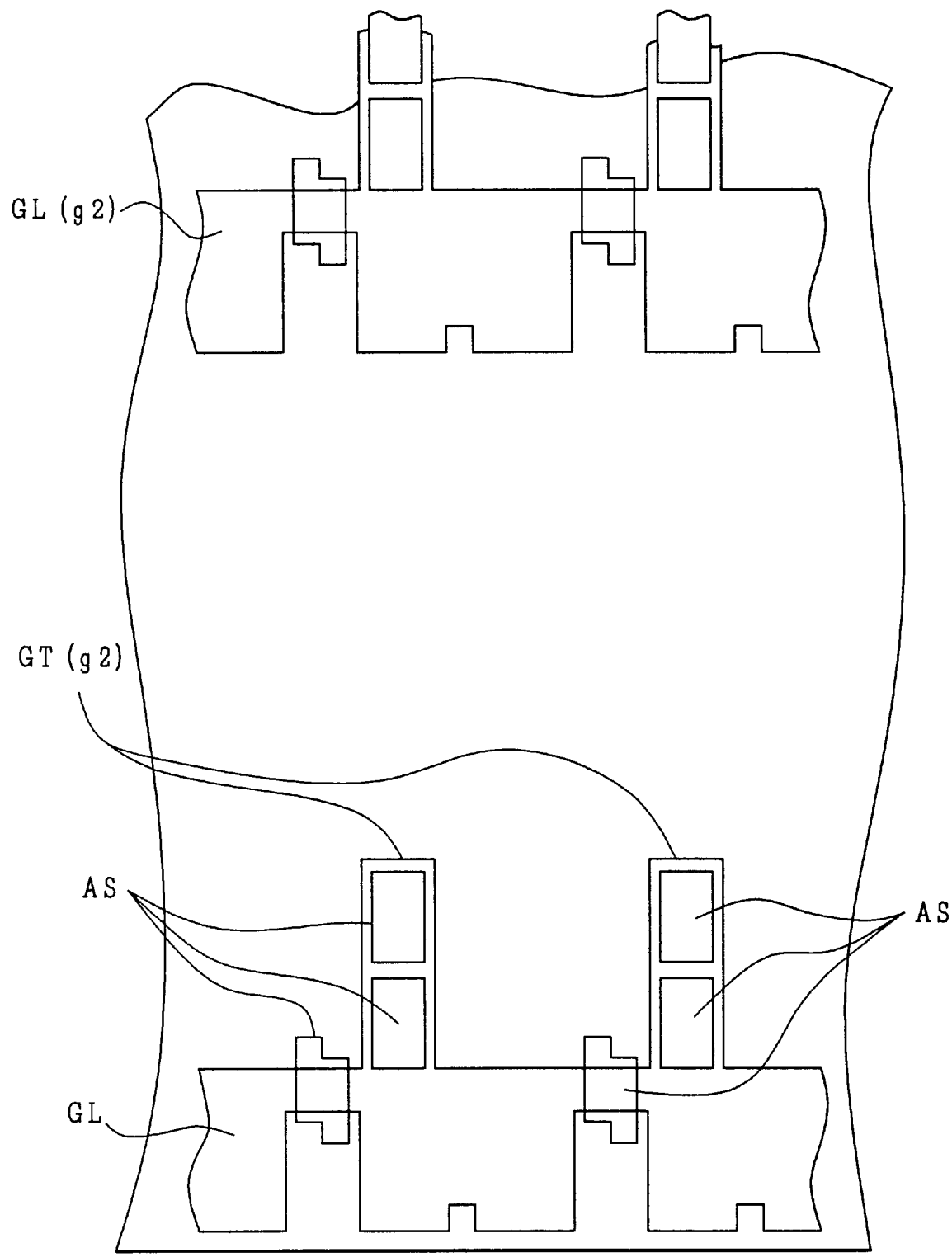
FIG. 17 is a plan view of only a conductive layer g2 and an i-type semiconductor layer AS of the picture element of FIG. 6.

FIG. 17 is a plan view of the second conductive layer g2 and the i-type semiconductor layer AS shown in FIG. 6. As shown in FIG. 17, the gate electrodes GT are made in a form of a perpendicular projection (branching off upward to form an inverted T in FIGS. 6 and 17) from the scanning signal lines GL.

The gate electrodes GT extend beyond the respective active areas of the thin film transistors TFT1 and TFT2 associated with them. These thin film transistors TFT1 and TFT2 have their gate electrodes GT continuous with each other. The gate electrode GT is formed of a single conductive layer g2. This second conductive layer g2 is a sputtered aluminum film, for example, of about 1,000 to 5,500 angstroms in thickness. An anodized oxide film of aluminum AOF is provided on the gate electrodes GT (see FIGS. 7B and 13B).

These gate electrodes GT are made larger than the i-type semiconductor layers AS to cover the semiconductor layers AS completely when viewed from the side of the gate electrodes GT, as shown in FIGS. 6 and 7 and 17. Even if a back light BL such as a fluorescent lamp is placed behind the substrate SUB1, the opaque aluminum gate electrodes GT shadow the semiconductor layers AS and shield them from light of the back light, and substantially prevent the electrical conduction due to the light illumination, i.e., the deterioration of the OFF characteristics of the TFTs.

The theoretical size of the gate electrode GT is such that its width is at least a distance for bridging the gap between the source and drain. electrodes SD1, SD2 including positioning tolerances of the source and drain electrodes SD1, SD2 with respect to the gate electrode GT, and is such that its projecting length is determined by the channel width W of the thin film transistor which in turn is determined by the desired ratio of the channel width W to the channel length L between the source electrode SD1 and the drain electrode SD2 associated with it which provides the desired mutual conductance gm (see FIG. 6).

The size of the gate electrode GT in the present embodiment is made larger than the aforementioned theoretical size.

Scanning Signal Line GL

The scanning signal line GL is made of the second conductive film g2 integral with the second conductive film g2 of the gate electrode GT and is formed in the same process step as for the gate electrode GT. The scanning signal line GL is also covered with the anodized oxide film of aluminum AOF.

Gate Insulating Film GI

The insulating film GI serves as the gate insulating films of the thin film transistors TFT1 and TFT2. The insulating film GI is formed over the gate electrode GT and the scanning signal line GL and the transparent pixel electrode ITO1, and is formed of a silicon nitride film of 1,200 to 2,700 Å in thickness (in this embodiment, about 2,000 Å) by the plasma CVD, for example.

As shown in FIG. 12, the entire area of the matrix area AR is covered with the gate insulating film GI and the peripheral portions around the matrix area AR are uncovered to expose the external connection terminals DTM and GTM.

i-type Semiconductor Layer AS

As shown in FIG. 17, the i-type semiconductor layers AS serve as the respective channel forming regions of the divided thin film transistors TFIT1 and TFT2. The i-type semiconductor layer AS is formed of an amorphous silicon film or polycrystalline silicon film of 200 to 220 angstroms in thickness (in this embodiment about 200 angstroms).

Continuously with formation of the $Si_2N_4$ gate insulating film GI, the i-type semiconductor layer AS is formed in the same plasma CVD apparatus by changing components of supply gases without exposing the glass substrates to air.

Continuously with formation of the i-type semiconductor layer AS, n⁺-type layers d0 (see FIG. 7) doped with phosphorus (P) of 2.5% for ohmic contact is likewise formed in a thickness of about 200 to 500 Å (in this embodiment, about 300 Å). Then, the lower substrate SUB1 is taken out of the CVD apparatus, and the N⁺-type semiconductor layer d0 and the i-type semiconductor layer AS are patterned into isolated islands by the photographic technology, as shown in FIGS. 6, 7 and 17.

The i-type semiconductor layer AS is also interposed between the scanning signal line GL and the video signal line DL at their intersections (crossover portions) as shown in FIGS. 6, 17.

This i-type semiconductor layers AS at the crossover portions reduce the possibility of short-circuit between the scanning signal lines GL and the video signal lines DL at their intersections.

Transparent Pixel Electrodes ITO1

The transparent pixel electrode ITO1 serves as one of a given pair of pixel electrodes opposing each other across a liquid crystal layer of the liquid crystal panel. The transparent pixel electrode ITO1 is connected to the source electrodes SD1 of both the thin film transistors TFT1 and TFT2.

If one of the two thin film transistors TFT1, TFT2 of one picture element happens to be defective and produce adverse effects, an appropriate portion is disconnected to eliminate the adverse effects by a laser beam, etc., during the manufacturing process. But if the defective transistor does not produce any adverse effects and the other transistor is operable, the defective transistor is left as it is. It is rare that both the two transistors TF1, TFT2 of one picture element are defective and produce adverse effects at the same time and this redundancy of the transistors reduces the possibility of point defects and line defects appearing in a display to a great extent.

The transparent pixel electrode ITO1 is made of a first conductive film d1. The conductive film d1 is a sputtered transparent conductive film (Indium-Tin-Oxide, ITO, or NESA film) of about 1,000 to 2,000 Å in thickness (e.g., in this embodiment about 1,400 Å).

Source and Drain Electrodes SD1 and SD2

Figure 18:
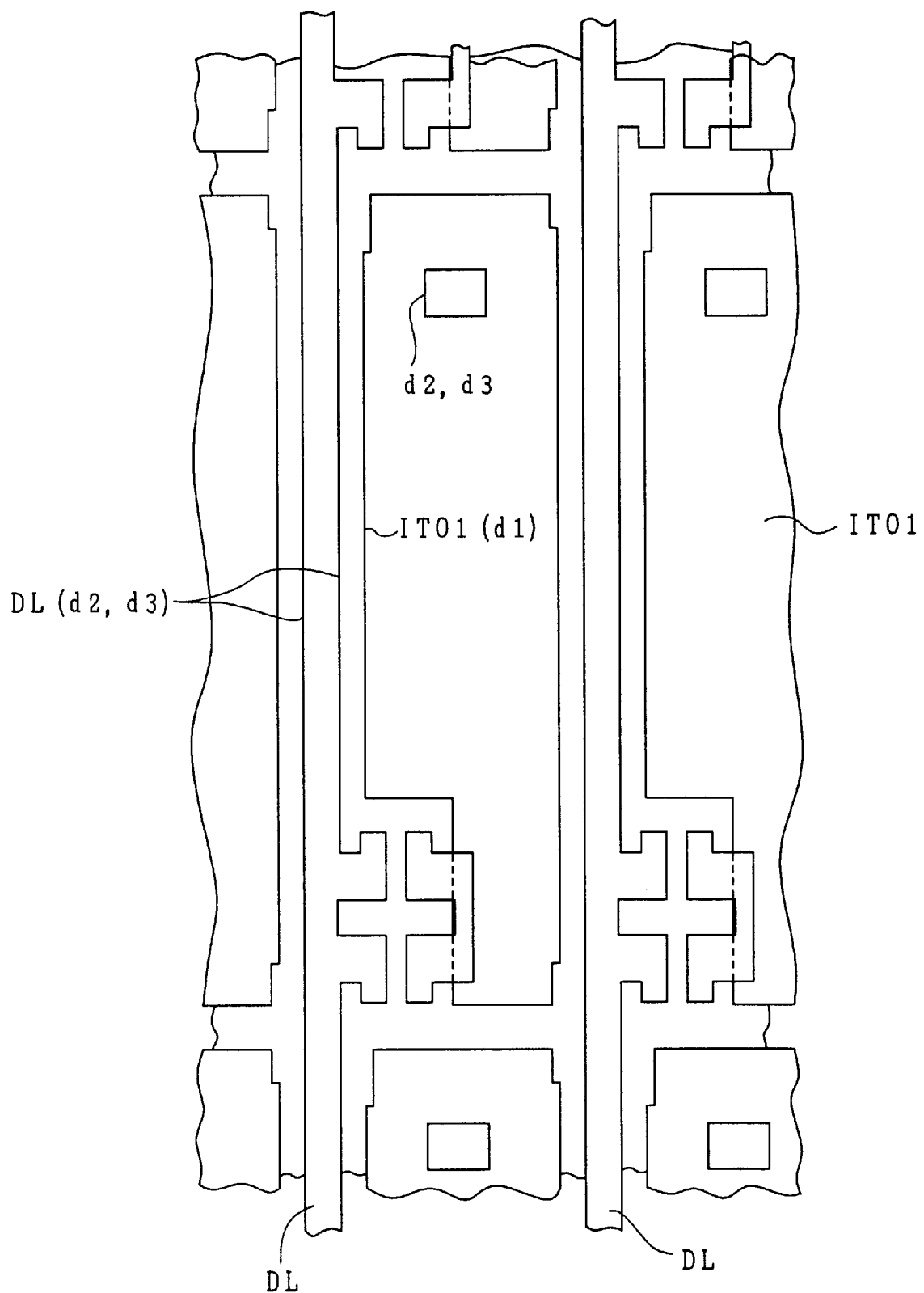
FIG. 18 is a plan view of only conductive layers d1, d2 and d3 of the picture element of FIG. 6.

The source and drain electrodes SD1 and SD2 of each of the divided thin film transistors TFT1 and TFT2 are spaced from each other on the semiconductor layer AS as shown in FIGS. 6, 7 and FIG. 18 which is a plan view of the first to third conductive layers d1 to d3 of FIG. 6 only.

Each of the source electrode SD1 and the drain electrode SD2 is formed by stacking the second conductive film d2 and the third conductive film d3 sequentially in this order from the side of the N⁺-type semiconductor layer d0. These second conductive film d2 and third conductive film d3 of the source electrode SD1 are formed at the same process steps as for those of the drain electrode SD2.

The second conductive film d2 is a sputtered chromium film of 500 to 1,000 Å in thickness (about 600 Å in the present embodiment). The chromium film serves as a so-called barrier layer for preventing aluminum of the third conducting film d3 to be described later from diffusing into the N⁺-type semiconductor layer d0.

The second conductive film d2 may be also made of refractory metals (e.g., Mo, Ti, Ta or W) or its silicide (e.g., $MoSi_2$, $TiSi_2$, $TaSi_2$ or $WSi_2$).

The third conductive film d3 is a sputtered aluminum film of 3,000 to 5,000 Å angstrom in thickness ( about 4,000 Å in the present embodiment). The aluminum layer produces less stress therein than the chromium layer such that the aluminum layer are made thick to reduce the resistances of the source electrode SD1, the drain electrode SD2 and the video signal line DL.

The third conductive film d3 may be also made of aluminum containing silicon, or copper as an additive.

After the second and third conductive films d2, d3 have been patterned with the same mask, the N⁺-type layer d0 is removed by using the same mask or the second and third conductive films d2, d3. The N+-type layer d0 remaining on the i-type semiconductor layer AS is removed by using self-alignment leaving the portions of the layer d0 covered with the second and third conductive films d2, d3.

The N+-type layer d0 is etched away in its entire thickness, and the top portion of the i-type semiconductor layer AS is also slightly etched away, but the amount of the i-type semiconductor layer AS to be etched away is controlled by the length of time for etching.

The source electrode SD1 is connected to the transparent pixel electrode ITO1 and rides over a step of the i-type semiconductor layer AS the height of which is a sum of the thicknesses of the second conductive film d2, the anodized oxide film AOF, the i-type semiconductor layer AS and the N+-type layer d0.

The source electrode SD1 is composed of the second conductive film d2 riding over the step of the i-type semiconductor layer AS and the third conductive film d3 superposed over the second conductive film d2.

This third conductive film d3 of the source electrode SD1 is provided to ride over the step of the i-type semiconductor layer AS because the second conductive chromium film d2 cannot be made thick enough to ride over the step due to the increase in the stress produced therein. The thick third conductive film d3 improves the step coverage. The third conductive film d3 can be made thick such that it can greatly reduce the resistance of the source electrode SD1, and this applies to those of the drain electrode SD2 and the video signal line DL.

Passivation Film PSV1

The passivation film PSV1 is formed over the thin film transistor TFT and the transparent pixel electrode ITO1 mainly for protecting the thin film transistor TFT against humidity or the like, and is high in its light transmission and highly resistant to humidity. The passivation film PSV1 is about 1 micron in thickness and made of silicon oxide or a silicon nitride prepared by the plasma CVD, for example.

As shown in FIG. 12, the passivation film PSV1 covers the entire matrix area AR, the peripheral portions around the matrix area AR are uncovered to expose the external connection terminals DTM, GTM, and some portions are uncovered for electrically connecting by a silver paste AGP the common electrode COM on the upper substrate SUB2 to the leading-out line INT which is formed on the lower substrate SUB1 and which is connected to some of the external connection terminals.

The passivation film PSV1 is made thick considering its protective performance while the gate insulating film GI is made thin considering the mutual conductance gm of the thin film transistor.

As shown in FIG. 12, the passivation film PSV1 having a highly protective function is made larger than the gate insulating film GI to cover the peripheral portions as wide as possible.

Shielding Film BM

Figure 19:
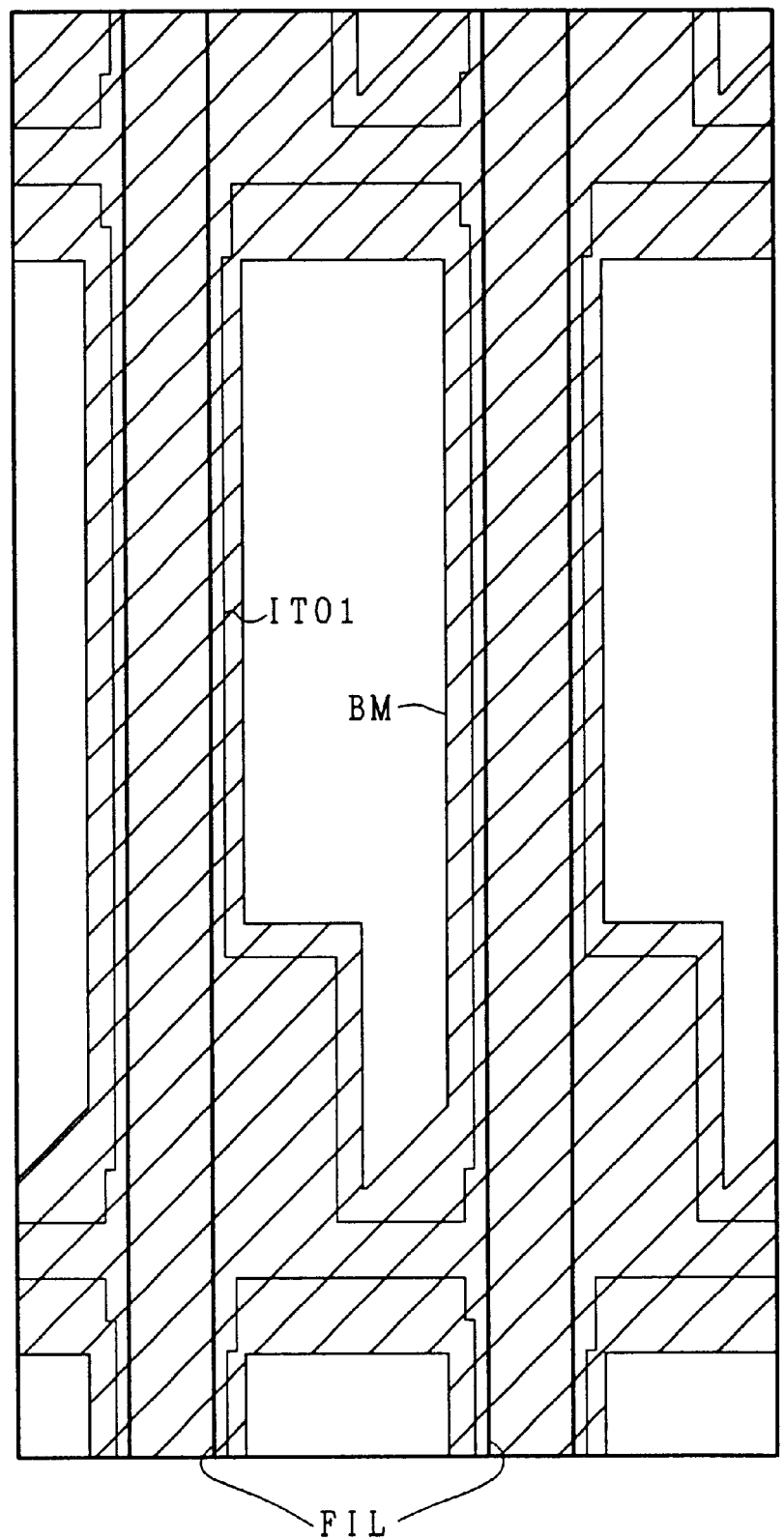
FIG. 19 is a plan view of only picture element electrode layers and a light-blocking layer and color filter layers of the picture elements of FIG. 6.

The shielding film BM is disposed on the inner surface of the upper substrate SUB2 for shielding any external light coming from the top of FIG. 7 from entering the i-type semiconductor layer AS serving as the channel forming region. The shielding film BM has a pattern indicated as a hatched area in FIG. 19. FIG. 19 is a plan view of the first conductive layer d1 of the ITO film, the filter layer FIL and the shielding film BM of FIG. 6. The shielding film BM is formed of a film having a highly light-blocking property, e.g., an aluminum film or a chromium film. In the present embodiment, the shielding film BM is a sputtered chromium film of about 1,300 Å in thickness.

The i-type semiconductor layer AS for the thin film transistors TFT1 and TFT2 is sandwiched between the shielding film BM and the large-sized gate electrode GT such that it is shielded from the external ambient light or the back light. The shielding film BM is disposed around each pixel as hatched in FIG. 19 to form a matrix which is called a black matrix, and defines the effective display area of each pixel. As a result, the shielding film BM sharply defines the contour of each pixel and improves the contrast ratio of a display. This shielding film BM has two functions of shielding the semiconductor layer AS and serving as a black matrix.

Further, since the shielding film BM is disposed at a portion of the upper substrate SUB2 facing the starting edge portion of rubbing treatment on the transparent pixel electrode ITO1 which corresponds to ithe lower right hand portion in FIG. 6, and it prevents light from passing through that portion of the upper substrate SUB2, even if domains occurs in the liquid crystal layer at the edge portion, the display characteristics are not degraded because the domains cannot be observed.

The backlight may be placed on the side of the upper substrate SUB2, and the LCD may be viewed from the side of the lower substrate SUB1.

As shown in FIG. 11, the shielding film BM extends to the peripheral portions around the matrix area in a form of a picture frame integrally with the matrix area pattern having a large number of apertures therein each associated with one picture element shown in FIG. 19. As shown in FIGS. 11–14A, 14B, the shielding film BM extends outside the sealing member SL to prevent leakage light such as reflected light from equipment such as a personal computer from entering the matrix area.

The outside edges of the shielding film BM are set back from the corresponding edges of the upper substrate SUB2 by a distance of about 0.3–1.0 mm to avoid the cut off lines of the upper glass substrate SUB2.

Color Filter FIL

Figure 20:
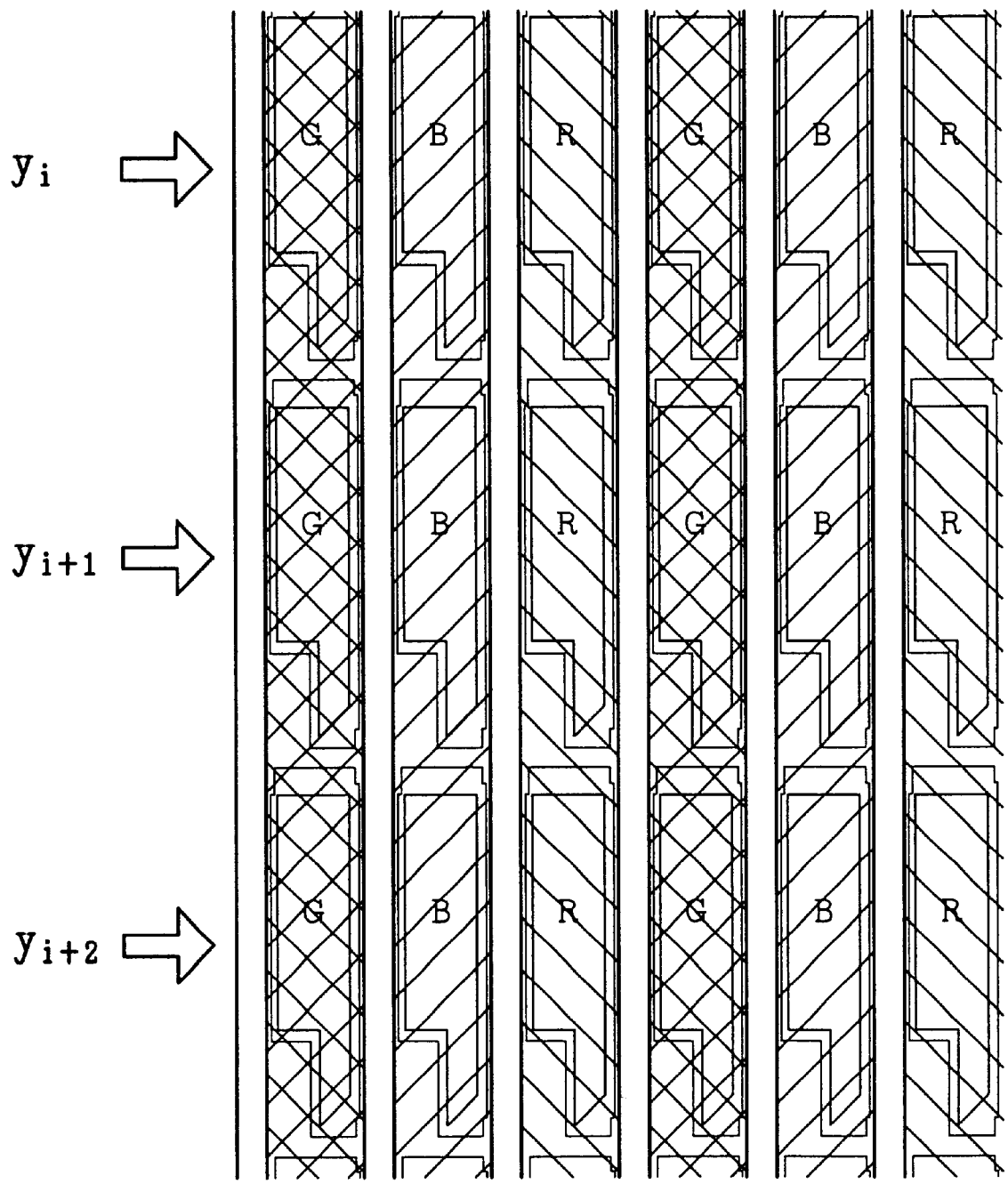
FIG. 20 is a plan view of only picture element electrode layers and a light-blocking layer and color filter layers s of the plural picture elements of FIG. 9.

The color filter FIL is made by coloring with dyes a dyeing base made of a resin material such as an acrylic resin. As shown in FIG. 20, the color filter FIL having different colors is formed in the shape of stripes and registered with corresponding pixels. FIG. 20 shows the first conductive film d1, the black matrix layer BM and the color filter layer FIL of FIG. 9, and the B, G and R filters, FIL, are indicated by hatching at 45 degrees, hatching at 135 degrees and crosshatching, respectively.

The color filter FIL is made large enough to cover the entire pixel electrode IT01 as shown in FIGS. 19, 20, and the opening of the shielding film BM is made smaller than the area of the pixel electrode ITOI and the area of the color filter FIL.

The color filter FIL can also formed in the following manner. Initially, a dyeing base is formed on the surface of the upper transparent glass substrate SUB2, and portions of the dyeing base intended for the colors other than red color are removed by photolithographic technology. Then, the remaining dyeing base is dyed with the red dye and fixed to complete the red filter R. Next, the green filter G and blue filter B are sequentially formed on the substrate SUB2 in the similar manners.

Passivation Film PSV2

The passivation film PSV2 is provided for preventing the dyes of the color filters FIL having the different colors from oozing into the liquid crystal LC. The passivation film PSV2 is made of a transparent resin material such as an acrylic resin or epoxy resin.

Common Electrode ITO2

The common transparent pixel electrode ITO2 faces the transparent pixel electrodes ITO1 each for one pixel on the lower transparent glass substrate SUB1 such that the potential difference (or electric field) between each pixel electrode ITO1 and the common pixel electrode ITO2 varies the optical state of the liquid crystal sandwiched between the pixel electrode ITO1 and the common pixel electrode ITO2.

This common transparent pixel electrode ITO2 is supplied with a common voltage Vcom. This common voltage Vcom is a potential intermediate between a low-level driving voltage Vdmin and a high-level driving voltage Vdmax which are applied to the video signal line DL. If a power supply voltage for integrated circuits in the video signal driver circuit is desired to be approximately halved, an alternating voltage is applied to the common pixel electrode ITO2. A plan view of the common pixel electrode ITO2 is shown in FIGS. 11 and 12.

Gate Terminal Portion

FIGS. 21A and 21B illustrate a connection structure from the scanning signal line GL of the display matrix to its external connection terminal GTM, and FIG. 21A is a plan view thereof and FIG. 29B is a cross sectional view taken along line XXIB—XXIB of FIG. 21A. The portion of FIGS. 21A, 21B corresponds to the bottom portion of FIG. 12, and the inclined wiring line portions are indicated by straight lines for convenience.

Reference character AO designates a photolithographic mask pattern, namely, a photoresist pattern for selective anodization. This photoresist is removed after the process of anodization, and the pattern AO disappears in the completed device, but it leaves its trace on the gate line GL because the oxide film AOF is formed selectively in the gate line GL as shown in FIG. 21B.

In FIG. 21A, the left-hand side to the boundary line AO of the photoresist is a region which is covered with the photoresist and is not anodized, and the right-hand side to the boundary is a region which is exposed from the photoresist and is anodized. The anodized Al layer g2 forms a film AOF made of its oxide $Al_2O_3$ in its surface and reduces the volume of its lower conductive portion. The anodization is carried out to preserve the appropriate thickness of the conductive portion for a proper length of time with a proper voltage. The mask pattern AO traverses the scanning line GL, not in a straight line, but in a folded line.

In FIG. 21A, the Al layer g2 is indicated as a hatched area for easy understanding, and the non-anodized region is patterned in a form of a comb. Wide aluminum layers tend to produce whiskers in their surface and therefore one GL line is formed of a plurality of thin lines arranged in parallel with each other to prevent occurrences of whiskers and minimize the possibility of broken lines and the increase in electrical resistance.

In the present embodiment, therefore, the ends of teeth of the comb shape are indented along the border of the mask AO.

The gate terminal GTM is comprised of the Cr layer g1 having an excellent contact property with the silicon oxide SiO layer and a higher resistance to galvanic corrosion than Al and the transparent conductive layer d1 for protecting the surface of the Cr layer g1 and lying in the same level as the pixel electrode ITO1. The transparent conductive layer d1 is identical with the pixel electrode ITO1 and is formed simultaneously with it.

Incidentally, the conductive layers d2 and d3 formed over and on the sides of the gate insulating film GI remain because the photoresist covered the conductive layers d2 and d3 in that portions such that the conductive layers g2 and g1 may not be etched away through pin holes in the conductive layers d2 and d3 produced therein at the time of etching the conductive Layers d2 and d3. Moreover, the ITO layer d1 extending rightward over the gate insulating film GI is provided for supplementing the countermeasures.

In FIG. 21A, the gate insulating film GI is formed on the right-hand side of its boundary, and a passivation film PSV1 is also formed on the right-hand side of its boundary such that the terminal portion GTM on the left-hand side of its boundary is exposed to be in electric contact with the external circuits.

FIGS. 21A, 21B illustrate one gate line GL and one gate terminal associated with it, and FIG. 12 shows a plurality of gate lines GL and gate terminal associated therewith arranged vertically to form a terminal group Tg at its lower left-hand side (also see FIG. 11). The left-hand ends of the gate terminals extend beyond the cutoff line CT1 of the substrate SUB1 during the manufacturing operation and are electrically connected with each other by the wiring conductor SHg to be short-circuited. The wiring conductor SHg is used for supplying a voltage in the anodization process and is effective for preventing electrostatic breakdown from occurring in the rubbing operation for its alignment film ORI1.

Drain Terminal DTM

FIGS. 22A and 22B illustrate the connection structure from the video signal line DL to its external connection terminal DTM, FIG. 22A is a plan view, and FIG. 22B is a cross sectional view taken along line XXII B—XXII B of FIG. 22A. FIGS. 22A and 22B correspond to the upper right-hand portion of FIG. 12, are rotated through 90 degrees for convenience, and the right-hand side portion of FIGS. 22A and 22B correspond to the upper end portion or the lower end portion of the substrate SUB1.

Reference character TSTd designates test terminals which are not connected to any external terminals and which are made larger for contact with a probe or the like than their wiring portions. Likewise, the drain terminal DTM is also made wider than its wiring portion so as to be connected to an external circuit. The test terminals TSTd and the external connection drain terminals DTM are alternately and vertically arranged, and the ends of the test terminals TSTd are offset away from the edge of the substrate SUB1 such that the test terminals TSTd terminates without reaching the edge of the substrate SUB1 as shown in FIG. 22A. As shown in FIG. 12, the drain terminals DTM constitute the terminal group Td (whose suffix is omitted), and extend beyond the cutoff line CT1 of the substrate SUB1 such that they are electrically connected together to be short-circuited between them by the conductive line SHd for preventing electrostatic breakdown during the fabrication operation. The drain connection terminals are connected to the ends of the video signal lines on the side opposite from the test terminals TSTd across the matrix area and the test terminals TSTd are connected to the other ends of the video signal lines on the side opposite from the drain terminals DTM across the matrix area.

As in the case of the gate terminal GTM, the drain connection terminal DTM is formed of the Cr layer g1 and the ITO layer d1 and is connected with the video signal line DL at the portion which is not covered with the gate insulating film GI. The semiconductor layer AS formed over the end portion of the gate insulating film GI is provided for etching and sloping the edge of the gate insulating film. The passivation film PSV1 over the drain terminal DTM is removed for connection with an external circuit. Reference character AO designates the aforementioned anodizing mask for covering the area on left-hand side of line AO, and since the layer g2 is not present in the area not covered with the mask, there are no problems.

As illustrated in FIG. 13C, the wiring lines from the matrix area to the drain terminal portion DTM are constructed such that the layers d2 and d3 lying at the same level as the video signal lines DL extend midway of the width of the seal pattern SL immediately over the layers D1 and g1 lying at the same Level as the drain terminal portion DTM to minimize the possibility of broken lines and to protect the galvanically corrosive Al layer d3 as much as possible with the passivation film PSV1 and the seal pattern SL.

Structure of Holding Capacitor Cadd

As shown in FIG. 6, the transparent pixel electrodes ITO1 is configured such that its upper area on the side opposite from its lower area connected to the thin film transistor TFT faces the preceding adjacent scanning signal line GL. As is apparent from FIGS. 6 and 8, this structure forms a signal-holding electrostatic capacitance element (hereafter referred to merely as the holding capacitance element) Cadd between the transparent pixel electrode ITO1 acting as one electrode PL2 and the preceding adjacent scanning signal line GL acting as the other electrode PL1. This holding capacitance element Cadd uses the gate insulating film GI and the anodized oxide film AOF as its dielectric film.

FIG. 17 shows the holding capacitance element Cadd is formed in the widened portion of the second conductive layer g2 of the scanning signal line GL. The second conductive layer g2 is constricted to reduce the possibility of short-circuits with the video signal line DL at a point of their intersection.

FIG. 8 shows that, even if the transparent pixel electrode ITO1 is broken at a step produced by the electrode PL1 of the holding capacitance element Cadd, since an island made of the second and third conductive layers d2, d3 is disposed to ride over the step, the island prevents electrical disconnection there.

Equivalent Circuit of Entire Display Circuit

Figure 23:
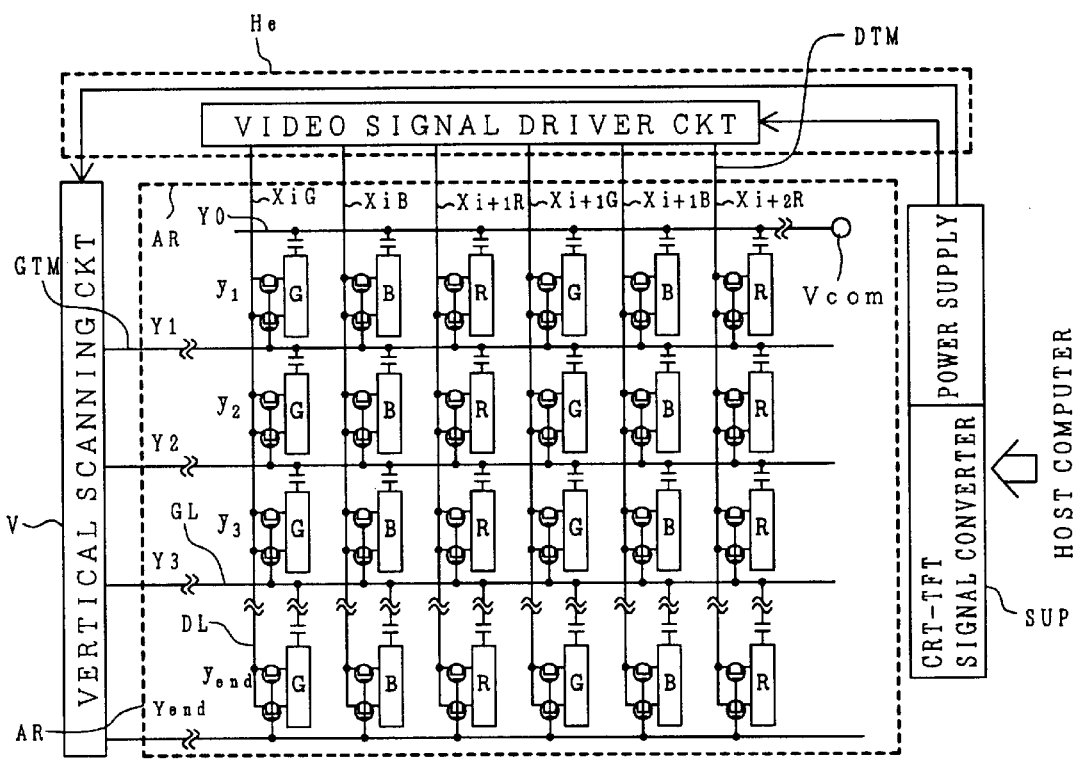
FIG. 23 is an equivalent circuit of a liquid crystal display portion of an active matrix addressing type color LCD.

FIG. 23 shows an equivalent circuit of the display matrix portion and a wiring diagram of its peripheral circuits and shows their actual geometric arrangement. Reference character AR denotes a matrix array comprising a plurality of pixels arranged two-dimensionally. Reference character X denotes the video signal line DL, and its suffixes G, B and R correspond to green, blue and red pixels, respectively. Reference character Y denotes the scanning signal lines GL and their suffixes 1, 2, 3, . . . , end are assigned in the order of the time sequence of scanning.

The video signal lines X (whose suffixes are omitted) are connected to the video signal driving circuit He at the top of FIG. 23, that is, they are brought out toward one side of the display panel PNL only, as in the case of the scanning signal lines Y. The scanning signal lines Y (whose suffixes are omitted) are connected to the vertical scanning circuit V.

Reference character SUP denotes a circuit which includes a power supply circuit for providing several stabilized voltages by dividing a voltage from a single power supply and a circuit for converting information for use in a CRT (cathode ray tube) from a host processor into information for use in the TFT liquid crystal display device.

Equivalent Circuit of Holding Capacitance Element Cadd and its Operations

Figure 24:
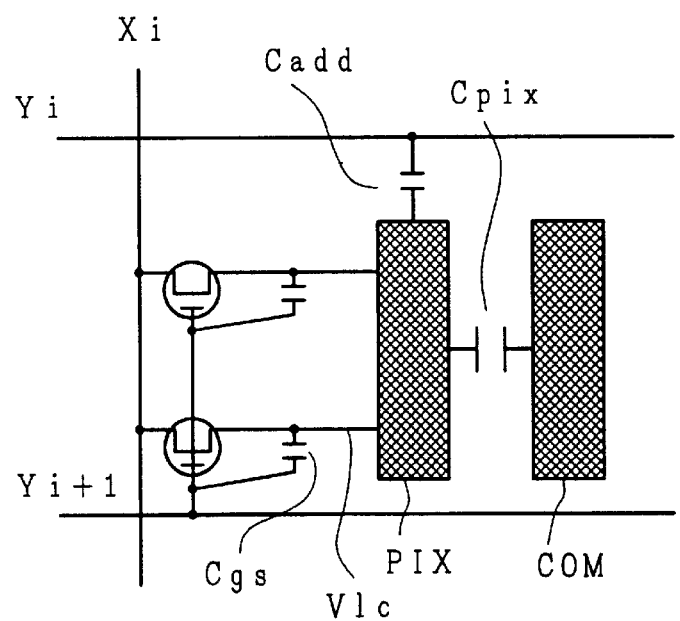
FIG. 24 is an equivalent circuit of the picture element of FIG. 6.

FIG. 24 is an equivalent circuit of the pixel shown in FIG. 6. In FIG. 24, reference character Cgs designates a parasitic capacitance formed between the gate electrode GT and the source electrode SD1 of the thin film transistor TFT.

The insulating film GI and the anodized oxide film AOF act as a dielectric film for the parasitic capacitance Cgs.

Reference character Cpix designates a liquid crystal capacitance formed between the transparent pixel electrode ITO1 (or PIX) and the common transparent pixel electrode ITO2 (or COM).

The dielectric film of the liquid capacitance Cpix is comprised of the liquid crystal LC, the passivation film PSV1, and the alignment films ORI1 and ORI2. Reference character Vlc designate a midpoint potential.

The holding capacitance element Cadd reduces the influences on the midpoint potential (the pixel electrode potential) Vlc of the gate potential variation ΔVg, on switching of the TFT. The following explains its mechanism:

The variation of the midpoint potential, $\Delta Vlc = \{Cgs/(Cgs + Cadd + Cpix)\} \times \Delta Vg$, The variation ΔVlc generates a DC component through the liquid crystal LC and can be reduced with increase in the holding capacitance Cadd.

Moreover, the holding capacitance Cadd also lengthens the time required for discharge and holds the video information for a long time after the TFT is turned off. Reduction of the DC component through the liquid crystal LC can improve the life time of the liquid crystal LC, and reduce the so-called "stickiflg", a phenomenon in which an image persists even after the video signals for the LCD are changed.

Since the gate electrode GT is made large enough to the entire area of the i-type semiconductor layer AS as described above, the area of the gate electrode GT overlapped by the source and drain electrodes SD1, SD2 increases, and the resultant increase in the parasitic capacitance Cgs produces the adverse effect which makes the midpoint potential Vlc susceptible to the gate signal (scanning signal) Vg.

However, this adverse effect can be eliminated by provision of the holding capacitance element Cadd.

In consideration of characteristics required for writing information into the pixel, the holding capacitance Cadd is set such that it is 4 to 8 times the liquid crystal capacitance Cpix (4×Cpix<Cadd<8×Cpix) and it is 8 to 32 times the parasitic capacitance Cgs (8×Cgs<Cadd<32×Cgs).

Method of Connecting an Electrode Line for an Additional Capacitor Cadd

As shown in FIG. 23, the uppermost line Yo of the scanning signal lines GL is used only as the capacitance electrode line, and is connected to the common transparent pixel electrode ITO2 voltage, Vcom.

In the embodiment shown in FIG. 12, the uppermost line Yo of the scanning signal lines GL is short-circuited to the common electrode COM via the terminal GTO, the leading-out line INT, the terminal DTO, and an external wiring. But the uppermost line Yo may be connected to the lowermost line Yendi of the scanning signal lines GL, and may be connected to a d.c. potential (a.c. grounded) other than Vcom or may be supplied with an extra scanning pulse Yo from the vertical scanning circuit V.

Connection Structure with External Circuits

Figure 15:
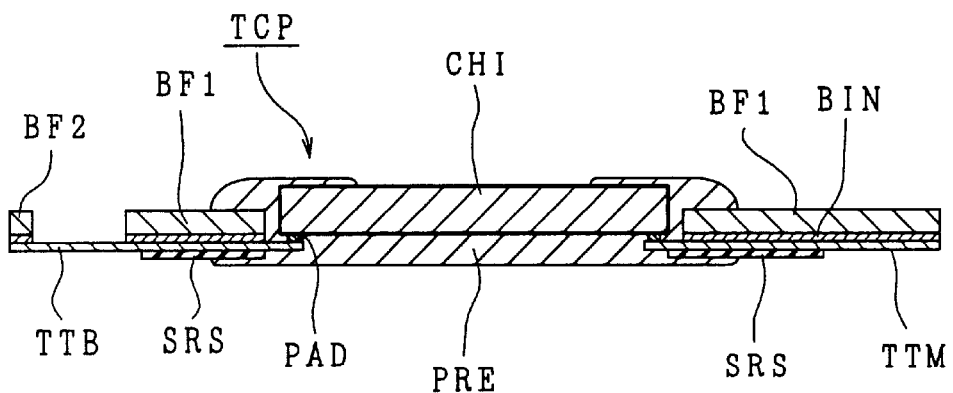
FIG. 15 is a cross sectional view of a structure of a tape carrier package in which an IC chip of a drive circuit is mounted on a flexible wiring circuit board.

As shown in FIG. 15, the tape carrier package TCP is a flexible circuit board (of the so-called tape automated bonding, TAB) mounting the IC chip including the scanning signal drive circuit V, the video signal drive circuits He, Ho. FIG. 16 is a cross sectional view of the tape carrier package TCP connected to the terminals DTM for the video signal circuit of the display panel PNL. Reference character TTB designates an input terminal and wiring portion of the integrated circuit CHI, and TTM designates an output terminal and wiring portion of the integrated circuit CHI. Their inner end portions which are often called the "inner leads" are connected to the bonding pads PAD of the integrated circuit CHI by the so-called face-down bonding method. Their outer end portions which are often called the "outer leads" corresponding to the input and output of the semiconductor integrated circuit chip CHI, respectively, are connected to the CRT-TFT data converter circuit and the power supply circuit SUP with solders, and are connected to the liquid crystal display panel PNL with an anisotropic conductive film ACF in a portion of the panel PNL in which the connection terminals DTM are exposed from the passivation film PSV1, which is covered with the tape carrier package TCP. The external connection terminal DTM (GTM) has high resistance to the galvanic corrosion because it is covered with at least one of the passivation film PSV1 and the tape carrier package TCP.

Reference character BF1 designates a base film made of polyimide or the like, and SRS is a solder resist film for masking an area not intended for soldering, to prevent the solder from adhering to the area during soldering operation.

The space between the upper and lower glass substrates outside the sealing pattern SL is filled with the epoxy resin EPX or the like for protection after cleaning, and this protection is supplemented by filling a silicone resin SIL between the edge of the tape carrier package TCP and that of the upper substrate SUB2.

Manufacturing Method

Next, fabrication of the lower transparent glass substrate SUB1 of the LCD will be explained by reference to FIGS. 25–27.

Figure 25:
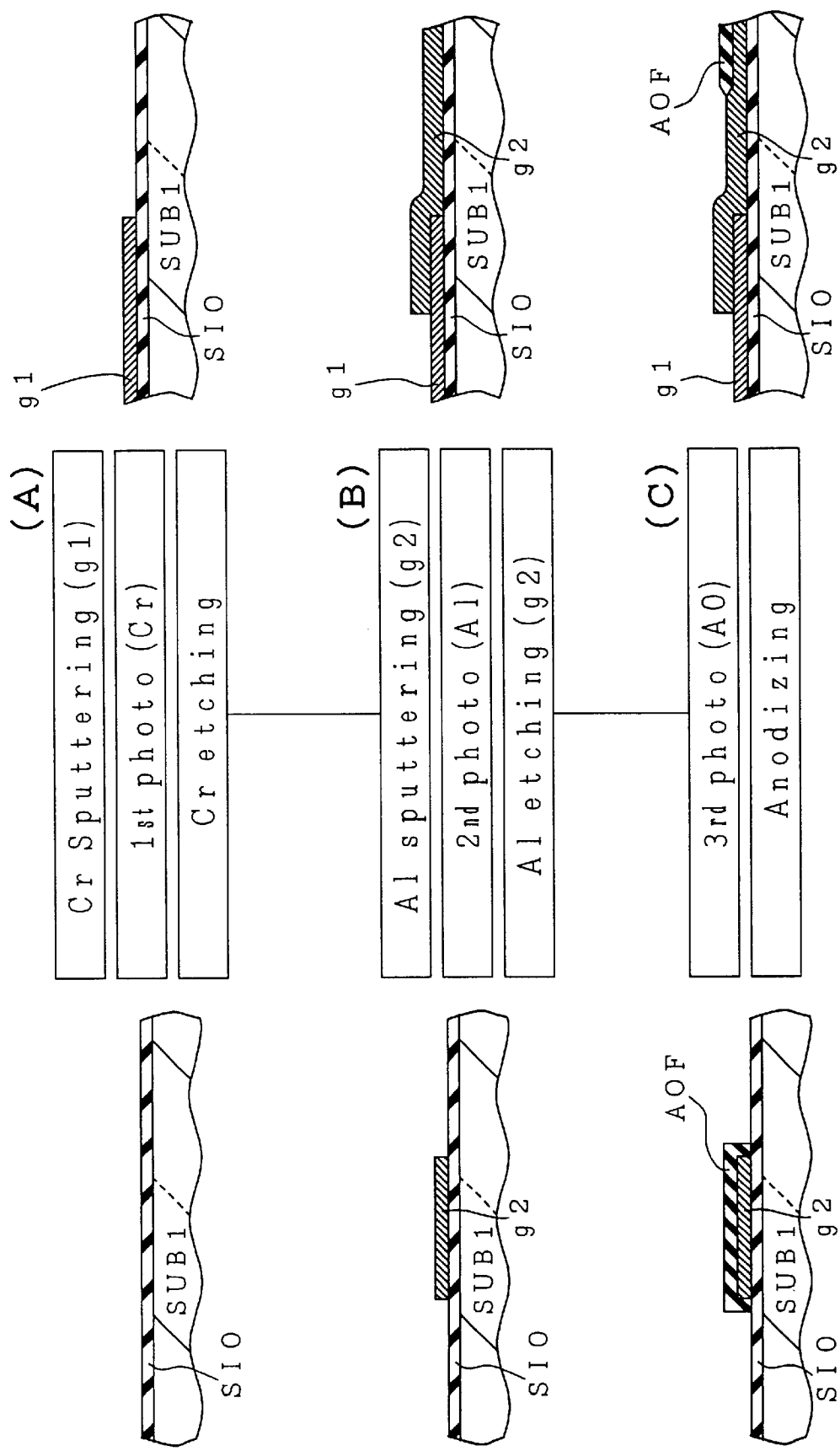
FIG. 25 is an illustration of process steps for a lower transparent glass substrate.
Figure 26:
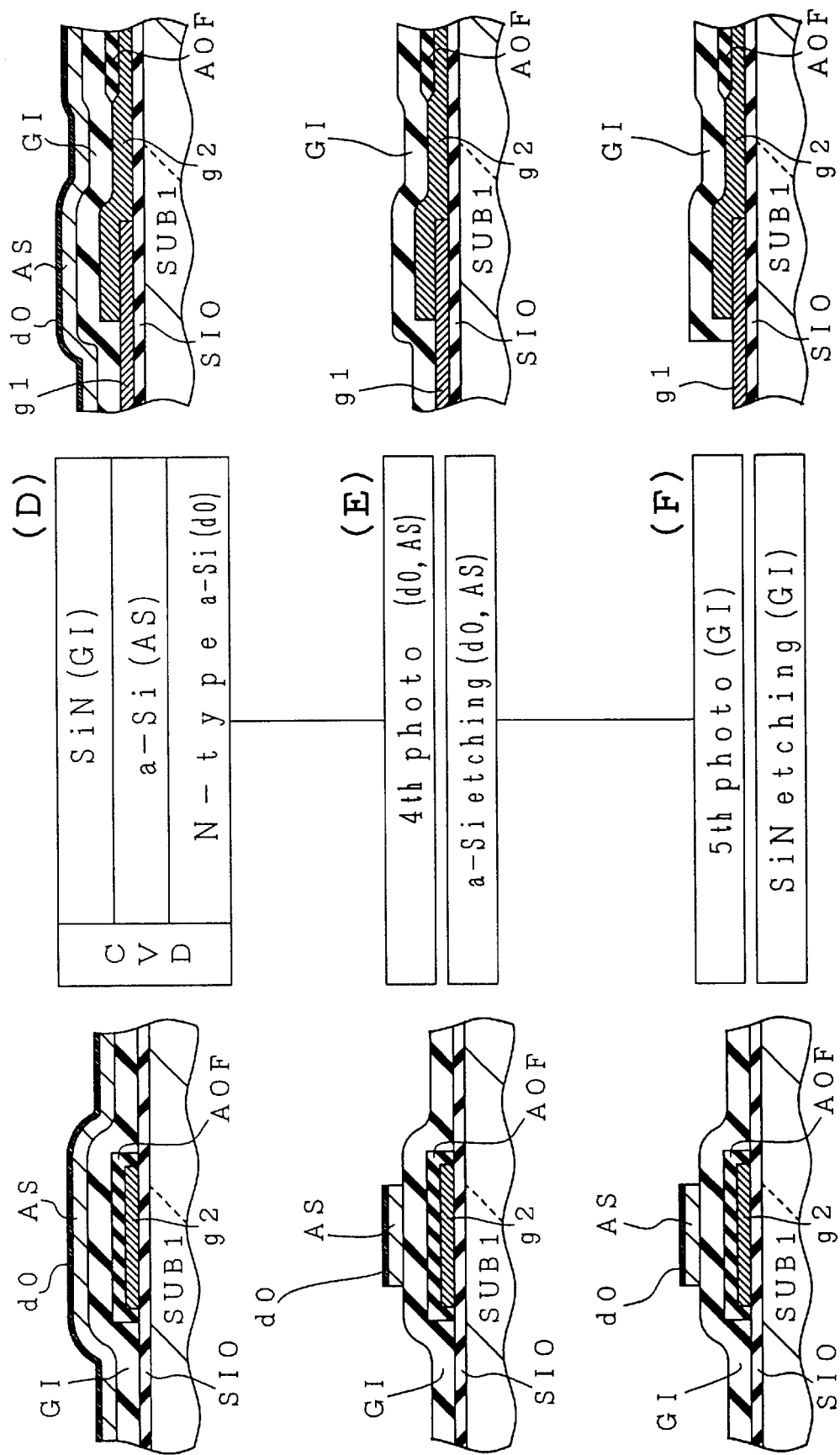
FIG. 26 is an illustration of process steps following the process steps of FIG. 25 for the lower transparent glass substrate.
Figure 27:
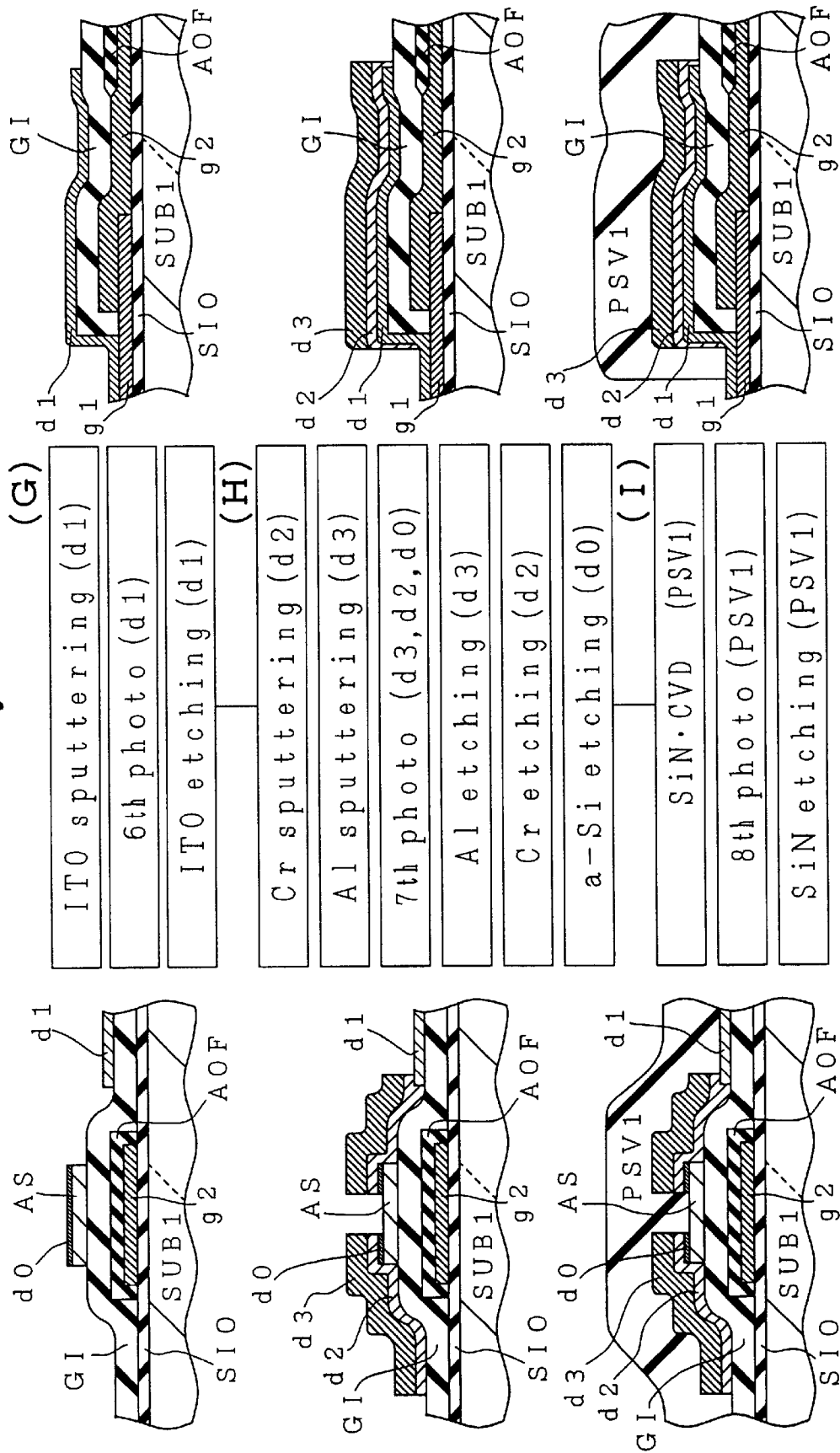
FIG. 27 is an illustration of process steps following the process steps of FIG. 26 for the lower transparent glass substrate.

In FIGS. 25–27, each of capital letters in parentheses in the central columns represent a particular process step, and figures at the left-hand side are cross sectional views of the pixel portion shown in FIG. 7 at respective process steps and figures at the right-hand side are cross sectional views of the gate terminal portion and its vicinity shown in FIGS. 21A, 21B at respective process steps. Each of Steps A to I except Step D corresponds to one photolithographic step, and each cross sectional view shows the state of one process step in which photoresists have been removed after photolithographic process has been completed. In each process step, the photolithographic treatment means a sequence of operations including coating of a photoresist, selective exposure of the photoresist using a pattern mask desired for each process step, and development of the exposed photoresist.

Process Step A, FIG. 25

A lower transparent glass substrate SUB1 made of 7059 glass (trade name) is coated on both surfaces thereof with silicon dioxide film SIO by dip treatment and then is baked at 500° C. for 60 minutes. A first conductive film g1 of 1,100 angstrom in thickness is deposited on the lower transparent glass substrate SUB1 by sputtering chromium. A gate terminal GTM, a drain terminal DTM, an anodization bus line SHg for the gate terminal GTM, a bus line SHd for connecting the drain terminals DTM together and an anodization pad (not shown) connected to the anodization bus line SHg are formed by the photolithographic treatment of the substrate SUBS and then etching selectively the first conductive film g1 using a ceric ammonium nitrate solution as an etching solution.

Process Step B, FIG. 25

A second conductive film g2 of 2,800 angstroms in thickness is formed on the substrate SUB1 by sputtering Al—Pd, Al—Si, Al—Si—Ta or Al—Si—Cu. The second conductive film g2 is selectively etched with a mixed acid solution of phosphoric acid, nitric acid and glacial acetic acid after the photolithographic treatment.

Process Step C, FIG. 25

After the photolithographic treatment for the formation of the anodizing mask AO, the substrate SUBS is dipped in the anodizing solution prepared by adjusting a 3% tartaric acid to have a PH of 6.25±0.05 with ammonia and then diluting the acid by a factor of 9 using ethylene glycol, and the anodizing current density is adjusted to 0.5 mA/cm$^2$ for fixed-current anodization.

Anodization is continued till an anodization voltage reaches 125V required to provide the required $Al_2O_3$ film thickness. Then, it is desirable that this state is maintained for several ten minutes for fixed-voltage anodization. This is important for obtaining a uniform $Al_2O_3$ film. In this way, the conductive film g2 is anodized to form anodized films AOF of 1,800 angstroms in thickness on the scanning signal line GL, the gate electrode GT and the electrode PL1.

Process Step D, FIG. 26

A Si nitride film of 2,000 angstroms in thickness is formed on the substrate SUB1 by introducing ammonia gas, silane gas and nitrogen gas into a plasma CVD apparatus, then an i-type amorphous Si film of 2,000 angstroms in thickness is formed on the substrate SUB1 by introducing silane gas and hydrogen gas into the plasma CVD apparatus, and then an $N^+$-type amorphous Si film of 300 angstroms in thickness is formed on the substrate SUB1 by introducing hydrogen gas and phosphine gas into the plasma CVD apparatus.

Process Step E, FIG. 26

An island of an i-type semiconductor layer AS is formed by selectively etching the $N^+$-type amorphous Si film and the i-type amorphous Si film by using $SF_6$ and $CCl_4$ as dry etching gases after the photolithographic treatment.

Process Step F, FIG. 26

The Si nitride film is selectively etched by using $SF_6$ as the dry etching gas after the photolithographic treatment.

Process Step G, FIG. 27

A first conductive film d1 of 1,400 angstroms in thickness is formedby sputtering indiumtin oxide (ITO). The uppermost layers of both the gate terminal GTM and the drain terminal DTM and the transparent pixel electrode ITO1 are formed by selectively etching the first conductive film d1using a mixed acid solution of hydrochloric acid and nitric acid as an etching solution after the photolithographic treatment.

Process Step H, FIG. 27

A second conductive film d2 of 600 angstroms in thickness is formed on the substrate SUB1 by sputtering chromium, and then a third conductive film d3 of 4,000 angstroms in thickness is formed on the substrate SUB1 by sputtering Al—Pd, Al—Si, Al—Si—Ti or Al—Si—Cu. The video signal line DL, the source electrode SD1 and the drain electrode SD2 are formed by etching the third conductive film d3 by using a solution similar to that in Process Step B and by etching the second conductive film d2 by using a solution similar to that in Process Step A, after the photolithographic treatment. Next, the $N^+$-type semiconductor layer d0 between the source and the drain is selectively removed by selectively etching the $N^+$-type amorphous Si layer using $CCl_4$ and $SF_6$ in a dry etching apparatus.

Process Step I, FIG. 27

A Si nitride film of 1 micron in thickness is formed by introducing ammonia gas, silane gas and nitrogen gas into a plasma CVD apparatus. The passivation film PSV1 is formed by selectively etching the Si nitride film using $SF_6$ as a dry etching gas after the photolithographic treatment.

Next, the lower transparent glass substrate SUB1 processed in this way has an alignment film deposited on its inner surface, and then is attached to the upper transparent glass substrate SUB2 processed separately from the lower substrate SUBS with an liquid crystal layer LC therebetween and with a sealing border around the liquid crystal layer LC to seal off the space between the upper and lower substrates SUB1 and SUB2. Then polarizers POL1, POL2 are attached to the outer surfaces of the lower and upper substrates SUB1, SUB2, respectively to complete the liquid crystal panel PNL.

The liquid crystal panel PNL is assembled integrally with optical films stacked on the liquid crystal panel PNL, a backlight and associated drive circuit boards as explained in connection with FIG. 3 to complete an LCD (an liquid crystal display module).

In the above-explained LCD of the present invention, polarizing axes of the upper and lower polarizers POL1, POL2, alignment directions of the upper and lower alignment films are arranged as explained in connection with FIGS. 1A–1G so as to prevent non-uniformity in a display image caused by heat from the light source of the backlight and so as to provide a high quality display image.

Figure 28:
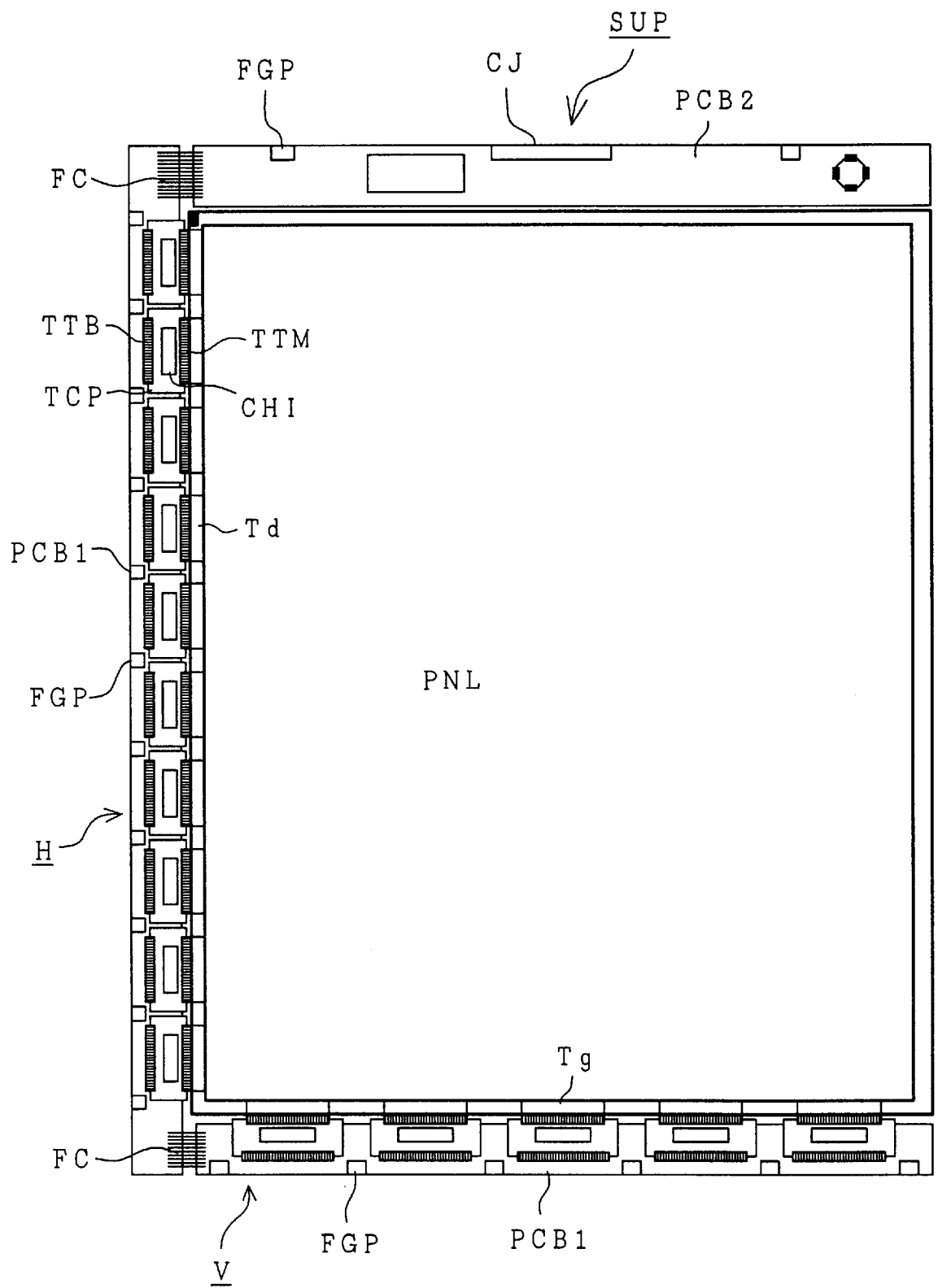
FIG. 28 is a plan view of the liquid crystal panel and drive circuit boards connected thereto.

FIG. 28 is a plan view of the liquid crystal panel and the drive circuit boards connected to the liquid crystal panel PNL. Reference character CHI denotes IC chips for driving the liquid crystal. panel PNL, five chips at the bottom being for a vertical scanning circuit and ten chips at the left-hand side being for a video signal drive circuit.

Figure 16:
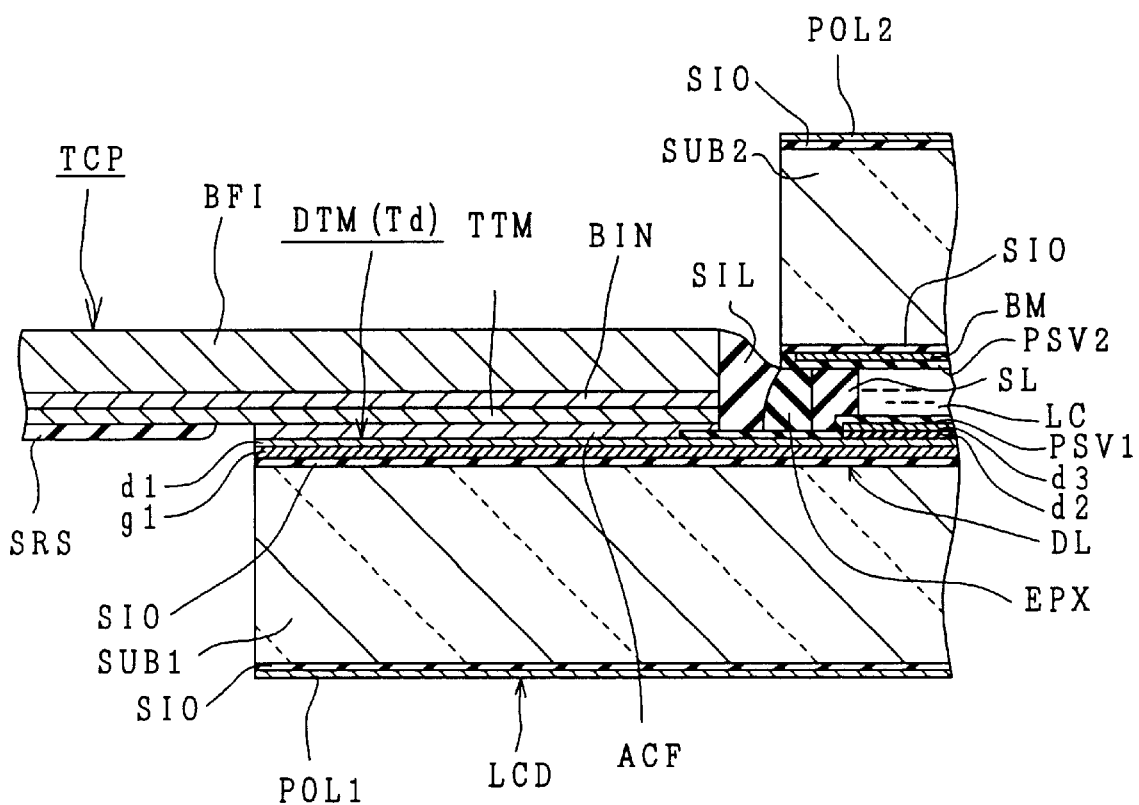
FIG. 16 is a cross sectional view of a major portion of a structure of a tape carrier package connected to terminals for a video signal circuit of the liquid crystal panel.

Reference character TCP denotes tape carrier packages incorporating an IC chip CHI for driving circuits by the tape automated bonding (TAB) method as shown in FIGS. 15 and 16. PCB1 are driving circuit boards on which the tape carrier packages TCP, capacitors and the like are mounted and are divided into a video signal drive circuit portion and a scanning signal portion.

Frame grounding pads FGP are soldered to spring pieces drawn integrally from the material of the shield case SHD. Reference character FC is a flat cable for electrically connecting the drive circuit boards PCB1 at the bottom side and at the left-hand side of the liquid crystal panel PNL.

The flat cable FC is comprised of a plurality of phosphor bronze wires plated with tin sandwiched between stripes of polyethylene film and a polyvinyl alcohol film.

Connection Structure of TCP

FIG. 15 is a cross sectional view of the tape carrier package mounting the IC chip CHI for the scanning signal drive circuit V or the video signal drive circuit H on a flexible circuit board. FIG. 16 is a cross sectional view of a major portion of the tape carrier package connected to the scanning signal circuit terminal GTM, as an example, of the liquid crystal panel.

In FIG. 28, reference characters TTB and TTM are input and output terminal wiring portions of the IC chip CHI, respectively, and are made of copper, for example, ends of the inner leads are connected to the bonding pads PAD of the IC chip CHI by using the so-called face down bonding as described above.

Ends of the outer leads of the terminals TTB and TTM correspond to the input and the output of the IC chip CHI, respectively, are connected to the CRT-TFT data converter circuit and the power supply circuit SUP with solders, and are connected to the liquid crystal display panel PNL with an anisotropic conductive film ACF as described above.

The package TCP is connected to the liquid crystal panel PNL such that its end portion covers the portion of the passivation film PSV1 removed for exposing the connection terminal GTM of the liquid crystal panel PNL.

Therefore the external connection terminals GTM and DTM are covered with at least one of the passivation film PSV1 and the tape carrier package TCP and have high resistance to the galvanic corrosion.

Reference character BF1 designates a base film made of polyimide or the like, and SRS is a solder resist film for masking an area not intended for soldering, to prevent the solder from adhering to the area during soldering operation as already explained.

The space between the upper and lower transparent glass substrates outside the sealing pattern SL is filled with the epoxy resin EPX or the like for protection after cleaning, and this protection is supplemented by a silicone resin SIL filled between the edges of the tape carrier package TCP and the upper substrate SUB2.

Drive Circuit Board PCB2

Electronic components such as ICs, capacitors and resistors are mounted on the drive circuit board PCB2. The drive circuit board PCB2 mounts thereon the circuit SUP including the power supply circuit for providing several stabilized voltages by dividing a voltage from a single power supply and the circuit for converting information for use in a CRT from a host processor into information for use in the liquid crystal display device. Reference character CJ denotes a connection portion to be connected to a connector (not shown) for external circuits.

The drive circuit boards PCB1 and PCB2 are electrically connected to each other by using joiners JN such as flat cables FC.

Next, another embodiment of an active matrix color LCD of another type, that is, the so-called in-plane switching type, in accordance with the present invention will be explained.

Figure 29:
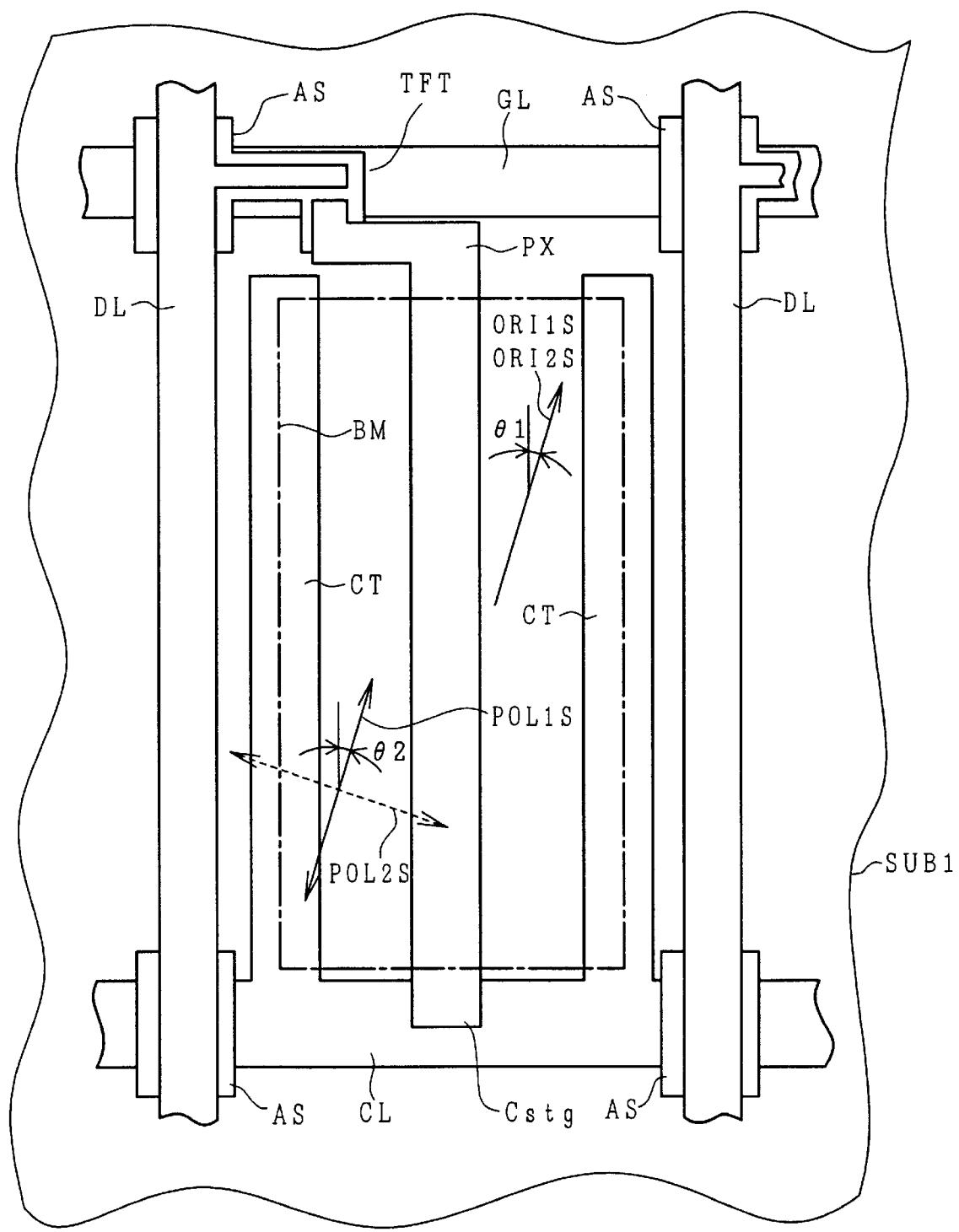
FIG. 29 is a plan view of a picture element, a light-blocking area of a black matrix BM and their vicinities in an embodiment of a in-plane-switching active matrix addressing type color LCD in accordance with the present invention.
Figure 30:
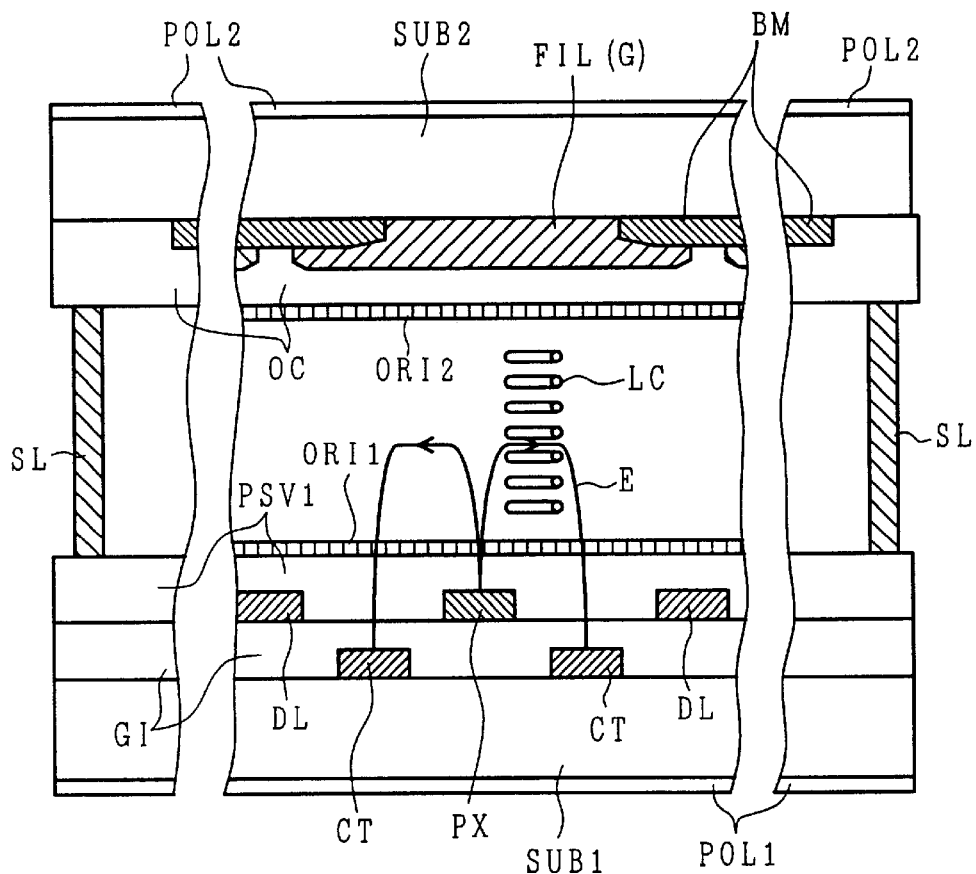
FIG. 30 is a cross sectional view of electrodes of a picture element and its vicinity in a display screen and peripheral portions of a liquid crystal panel in an embodiment of a in-plane-switching active matrix addressing type color LCD in accordance with the present invention.

FIG. 29 is a plan view of a pixel, a light-blocking area of a black matrix and their vicinity in this embodiment, and FIG. 30 is a cross sectional view of electrodes of the pixel and peripheral portions of the substrates.

As shown in FIG. 29, each pixel is disposed in an area enclosed by a scanning signal line (a gate signal line or a horizontal signal line) GL, a counter voltage signal line (a counter electrode line) CL, and two adjacent video signal lines (a drain signal line or a vertical signal line) DL.

Each pixel includes a thin film transistor TFT, a storage capacitance Cstg, a pixel electrode PX and an counter electrode CT. The scanning signal lines GL and the counter voltage signal lines CL extend horizontally and are arranged vertically in plural in FIG. 29. The video signal lines DL extend vertically and are arranged horizontally in plural. The pixel electrode PX is connected to the thin film transistor TFT, and the counter electrode CT is made integral with the counter voltage signal line CL. The thin film transistor TFT comprises a semiconductor layer AS made of amorphous silicon, for example, formed on a portion of the scanning signal line GL in the vicinity of the video signal line DL. A portion of the scanning signal line GL acts as the gate electrode of the thin film transistor TFT. The semiconductor layer AS is also interposed between the scanning signal line GL and the video signal lines DL at their intersection.

The pixel electrode PX and the counter electrode CT opposes each other, an electric field between the pixel electrode PX and the counter electrode CT controls the alignment state of the liquid crystal molecules LC (see FIG. 3) to modulate the amount of light passing through the liquid crystal LC and to display a image.

The pixel electrodes PX and the counter electrodes CT extend vertically in fine stripes and in a form of a comb as shown in FIG. 29.

The number O of comb's teeth of the counter electrode CT and the number P of comb's teeth of the pixel electrode PX in one pixel are always set to satisfy the relationship O=P+1. In this embodiment, O=2, P=1. This is intended to always satisfy the condition in which the teeth of the counter electrode CT and the teeth of the pixel electrode PX are arranged alternately and one teeth of the counter electrode CT is disposed immediately adjacent to the video signal line DL.

Under this condition, the electric field between the counter electrode CT and the pixel electrode PX is free from the influences of the electric field from the video signal line DL because the counter electrode CT shields the lines of electric force from the video signal line DL.

The counter electrode CT is always supplied with a voltage from via the counter voltage signal line CL an external source, is stable in potential with little voltage fluctuations even though it is adjacent to the video signal line DL. In this arrangement, a geometric distance of the pixel electrode PX from the video signal line DL is increased, the parasitic capacitance formed between the pixel electrode PX and the video signal line DL is greatly reduced, and fluctuations in the pixel electrode potential Vs caused by video signal voltages are controlled.

These suppress crosstalk occurring vertically which is a defect in display quality called vertical smear.

The electrode widths Wp and Wc of the pixel electrode PX and the counter electrode CT are 6 $\mu$m, respectively, and are set to be sufficiently larger than the design maximum, 4.5 $\mu$m, of the liquid crystal layer thickness to be describe later. Considering manufacturing variations, it is desirable that their tolerances are not less than 20% and the widths Wp, Wc are preferably sufficiently larger than 5.4 $\mu$m.

With this structure, components parallel to the substrate of the electric field applied to the liquid crystal layer is greater than components vertical to the substrate of the electric field, and this suppress the increase in the voltages required for driving the liquid crystal panel. The maximum of the electrode widths Wp and Wc are desirably smaller than the spacing L between the pixel electrode PX and the counter electrode CT.

This is because, if the distance between the electrodes is too small, then the lines of electric force curve sharply, this increases an area in which the components of the electric field vertical to the substrate are greater than the components of the electric field parallel to the substrate, and therefore the electric field parallel to the substrate is not applied to the liquid crystal layer efficiently. The spacing L between the pixel electrode PX and the counter electrode CT needs to be larger than 7.2 $\mu$m, assuming the tolerance in the spacing L is 20%. In this embodiment, the display panel is 14.5 cm (5.5 inches) diagonally and has resolution of 640 dots×480 dots, consequently the pitch in pixels is about 60 $\mu$m. The spacing L larger than 7.2 $\mu$m is realized by dividing one pixel into two.

The width of the video signal line DL is 8 $\mu$m, slightly larger than the pixel electrode PX and the counter electrode CT to prevent line defects, the spacing of about 1 $\mu$m is provided between the video signal line DL and the counter electrode CT to avoid line short defects therebetween, and the video signal line DL is disposed on the upper surface of the gate insulating layer and the counter electrode CT is disposed on the lower surface of the gate insulating layer to dispose them on different layers.

The spacing between the pixel electrode PX and the counter electrode CT is varied according to the liquid crystal material. This is because the electric field required to provide the maximum transmission depends upon liquid crystal material, and therefore the spacing is determined to provide the maximum transmission with a signal voltage having an amplitude within the maximum set by the withstanding voltage of the video signal drive circuit, depending on the liquid crystal material.

The spacing is about 15 $\mu$m in the case of the liquid crystal material to be described.

In this embodiment, the black matrix BM is disposed on the gate line GL, the counter voltage signal line CL, the thin film transistor TFT, the drain line DL, and the spacing between the drain line DL and the counter electrode CT, in a plan view.

FIG. 30 is a cross sectional view of one pixel and its vicinity and peripheral portions of the substrates of the liquid crystal panel of the in-plane switching type LCD.

In FIG. 30, on the lower transparent glass substrate SUB1 under the liquid crystal layer LC, there are the thin film transistor TFT (not shown), the storage capacitance Cstg (not shown) and the electrodes CT, PX, and on the upper transparent glass substrate SUB2 over the liquid crystal layer LC, there are a color filter FIL and a black matrix pattern for blocking of light. In FIG. 30, FIL(G) denotes a green filter.

As proposed in the Japanese Patent Application No. Hei 7-198349 which is assigned to the same assignee as the present application and is not laid-open on the filing date of this application, the black matrix pattern BM may be disposed on the lower transparent glass substrate SUB1.

The alignment films ORI1, ORI2 for controlling initial alignments of liquid crystal molecules are formed on the inner surfaces on the liquid crystal layer LC side of the transparent glass substrates SUB1, SUB2, respectively. The polarizers POL1, POL2 are attached to the outer surfaces of the transparent glass substrates SUB1, SUB2 with their polarizing axes perpendicular to each other (crossed Nicols arrangement), respectively. The alignment directions (rubbing direction of the substrates) ORI1S, ORI2S of the alignment films ORI1, ORI2 are inclined at $\theta$1, 15° for example, with respect to the longitudinal axis of the counter electrode CT. The polarizing axis POL1S of the polarizer POL1 is inclined at $\theta$2, 15° for example, with respect to the longitudinal axis of the counter electrode CT, and the polarizing axis POL2S of the polarizer POL2 is perpendicular to the polarizing axis POL1S.

Reference character OC denotes an overcoat, E is lines of electric force, SL is a sealing border, PSV1 is a passivation coating and GI is a gate insulator.

Further detail of an LCD similar to the LCD of FIGS. 29 and 30 is contained in U.S. Pat. No. 5,598,285 issued to Kondo, et al. on Jan. 28, 1997. This patent is hereby incorporated by reference for the purpose of including such detail.

This liquid crystal panel PNL is assembled integrally with optical films stacked on the liquid crystal panel PNL, a backlight and associated drive circuit boards as explained in connection with FIG. 3 to complete an LCD (an liquid crystal display module) The polarizing axes of the upper and lower polarizers POL1, POL2, alignment directions of the upper and lower alignment films ORI1, ORI2 are arranged as explained in connection with FIGS. 1A–1G so as to prevent non-uniformity in a display image caused by heat from the light source of the backlight and so as to provide a high quality display image.

The in-plane switching type LCD shown in FIGS. 29 and 30 towhich the present invention is applied prevents the reduction in viewing angles in a horizontal or vertical direction caused when the polarizing axes of the polarizers and the alignment directions of the alignment films are disposed at 0° or 90° with respect to the longitudinal axis of the line light source.

It is needless to say that the LCD of the present invention can be incorporated into stationary personal computers such as desk-top monitors and display devices for other equipment in addition to the transportable notebook personal computer shown in FIG. 5.

The present invention can be applied to a simple matrix type LCD in addition to the active matrix LCD of the twisted nematic type or the in-plane switching type.

As described above, the present invention provides the LCD capable of displaying a high quality image by suppressing non-uniformity in a display due to birefringent action induced by distortions in the transparent substrate caused by heat from the line light source of the backlight.

What is claimed is:

1. A liquid crystal display device comprising:

a liquid crystal panel comprising a pair of opposing transparent substrates each having an alignment film on an inner surface thereof, at least one of said pair of opposing transparent substrates having pixel electrodes on said inner surface thereof, a liquid crystal layer sandwiched between said alignment films, and a pair of polarizers, a first polarizer of said pair of polarizers being disposed in front of said liquid crystal layer and a second polarizer of said pair of polarizers being disposed behind said liquid crystal layer;

a driving circuit for supplying voltages to said liquid crystal panel in accordance with display signals; and a backlight having a line light source and disposed behind said liquid crystal panel;

wherein each alignment direction of said alignment films is parallel with a polarizing axis of one of said first and second polarizers of said pair of polarizers adjacent thereto; and said polarizing axis of another of said first and second polarizers of said pair of polarizers is perpendicular to a longitudinal axis of said line light source; and wherein adverse effects due to birefringence in said transparent substrates caused by heat from said line light source is suppressed.

2. A liquid crystal display device according to claim 1, wherein said liquid crystal panel further comprises an optically anisotropic phase compensating film disposed at least one of between said first polarizer and said liquid crystal layer and between said second polarizer and said liquid crystal layer, for increasing acceptable viewing angles of said liquid crystal panel.

3. A liquid crystal display device according to claim 1, wherein said liquid crystal panel further comprises an optically anisotropic phase compensating film disposed at least one of between said first polarizer and said liquid crystal layer and between said second polarizer and said liquid crystal layer, for shifting an optimum direction of viewing said liquid crystal panel.

4. A liquid crystal display device according to claim 1, wherein said polarizing axis of said first polarizer of said pair of polarizers extends in parallel to the longitudinal axis of said line light source and said polarizing axis of said second polarizer of said pair of polarizers extends perpendicular to the longitudinal axis of said line light source.

5. A liquid crystal display device comprising:

a liquid crystal panel comprising a pair of opposing transparent substrates each having an alignment film on an inner surface thereof, at least one of said pair of opposing transparent substrates having pixel electrodes on said inner surface thereof, a liquid crystal layer sandwiched between said alignment films, and a pair of polarizers, a first polarizer of said pair of polarizers being disposed in front of said liquid crystal layer and a second polarizer of said pair of polarizers being disposed behind said liquid crystal layer;

a driving circuit for supplying voltages to said liquid crystal panel in accordance with display signals; and a backlight disposed behind said liquid crystal panel and comprising a light guide and a line light source arranged along a side of said light guide;

wherein each alignment direction of said alignment films is parallel with a polarizing axis of one of said first and second polarizers of said pair of polarizers adjacent thereto; and said polarizing axis of another of said first and second polarizers of said pair of polarizers is perpendicular to a longitudinal axis of said line light source; and wherein adverse effects due to birefringence in said transparent substrates caused by heat from said line light source is suppressed.

6. A liquid crystal display device according to claim 5, wherein said liquid crystal panel further comprises an optically anisotropic phase compensating film disposed at least one of between said first polarizer and said liquid crystal layer and between said second polarizer and said liquid crystal layer, for increasing acceptable viewing angles of said liquid crystal panel.

7. A liquid crystal display device according to claim 5, wherein said liquid crystal panel further comprises an optically anisotropic phase compensating film disposed at least one of between said first polarizer and said liquid crystal layer and between said second polarizer and said liquid crystal layer, for shifting an optimum direction of viewing said liquid crystal panel.

8. A liquid crystal display device according to claim 5, wherein said polarizing axis of said first polarizer of said pair of polarizers extends in parallel to the longitudinal axis of said line light source and said polarizing axis of said second polarizer of said pair of polarizers extends perpendicular to the longitudinal axis of said line light source.

9. A liquid crystal display device comprising:
- a liquid crystal panel comprising a pair of opposing transparent substrates each having an alignment film on an inner surface thereof, at least one of said pair of opposing transparent substrates having pixel electrodes on said inner surface thereof, a liquid crystal layer sandwiched, between said alignment films, and a pair of polarizers, a first polarizer of said pair of polarizers being disposed in front of said liquid crystal layer and a second polarizer of said pair of polarizers being disposed behind said liquid crystal layer;
- a driving circuit for supplying voltages to said liquid crystal panel in accordance with display signals; and
- a backlight having a plurality of line light sources disposed behind a display area of said liquid crystal panel;
- wherein each alignment direction of said alignment films is parallel with a polarizing axis of one of said first and second polarizers of said pair of polarizers adjacent thereto; and
- said polarizing axis of another of said first and second polarizers of said pair of polarizers is perpendicular to longitudinal axes of said plurality of line light sources; and
- wherein adverse effects due to birefringence in said transparent substrates caused by heat from said plurality of line light sources is suppressed.

10. A liquid crystal display device according to claim 9, wherein said liquid crystal panel further comprises an optically anisotropic phase compensating film disposed at least one of between said first polarizer and said liquid crystal layer and between said second polarizer and said liquid crystal layer, for increasing acceptable viewing angles of said liquid crystal panel.

11. A liquid crystal display device according to claim 9, wherein said liquid crystal panel further comprises an optically anisotropic phase compensating film disposed at least one of between said first polarizer and said liquid crystal layer and between said second polarizer and said liquid crystal layer, for shifting an optimum direction of viewing said liquid crystal panel.

12. A liquid crystal display device according to claim 9, wherein said polarizing axis of said first polarizer of said pair of polarizers extends in parallel to the longitudinal axes of said plurality of line light sources and said polarizing axis of said second polarizer of said pair of polarizers extends perpendicular to the longitudinal axes of said plurality of line light sources.

13. A liquid crystal display device comprising:
- an liquid crystal panel comprising a pair of opposing transparent substrates each having an alignment film on an inner surface thereof, one of said pair of opposing transparent substrates having a plurality of thin film transistors each corresponding to a pixel on said one of said pair of opposing transparent substrates, gate wiring lines connected to respective gates of said plurality of thin film transistors and drain wiring lines connected to respective drains of plurality of thin film transistors, a liquid crystal layer sandwiched between said alignment films, and a pair of polarizers, a first polarizer of said pair of polarizers being disposed in front of said liquid crystal layer and a second polarizer of said pair of polarizers being disposed behind said liquid crystal layer;
- a driving circuit for supplying voltages to said liquid crystal panel in accordance with display signals; and
- a backlight having a line light source and disposed behind said liquid crystal panel;
- wherein each alignment direction of said alignment films is parallel with a polarizing axis of a respective one of said first and second polarizers adjacent thereto;
- an extending direction of one of said drain wiring lines and said gate wiring lines are parallel with a polarizing axis of one of said first and second polarizers of said pair of polarizers; and
- said polarizing axis of another of said first and second polarizers of said pair of polarizers is perpendicular to a longitudinal axis of said line light source; and
- wherein adverse effects due to birefringence in said transparent substrates caused by heat from said line light source is suppressed.

14. A liquid crystal display device according to claim 13, wherein said liquid crystal panel further comprises an optically anisotropic phase compensating film disposed at least one of between said first polarizer and said liquid crystal layer and between said second polarizer and said liquid crystal layer, for increasing acceptable viewing angles of said liquid crystal panel.

15. A liquid crystal display device according to claim 13, wherein said liquid crystal panel further comprises an optically anisotropic phase compensating film disposed at least one of between said first polarizer and said liquid crystal layer and between said second polarizer and said liquid crystal layer, for shifting an optimum direction of viewing said liquid crystal panel.

16. A liquid crystal display device according to claim 13, wherein said polarizing axis of said first polarizer of said pair of polarizers extends in parallel to the longitudinal axis of said line light source and said polarizing axis of said second polarizer of said pair of polarizers extends perpendicular to the longitudinal axis of said line light source.

17. A liquid crystal display device comprising:
- a liquid crystal panel comprising a pair of opposing transparent substrates each having an alignment film on an inner surface thereof, at least one of said pair of opposing transparent substrates having pixel electrodes on said inner surface thereof, a liquid crystal layer sandwiched between said alignment films, and a pair of polarizers, a first polarizer of said pair of polarizers being disposed in front of said liquid crystal layer and a second polarizer of said pair of polarizers being disposed behind said liquid crystal layer;
- a driving circuit for supplying voltages to said liquid crystal panel in accordance with display signals; and
- a backlight having a line light source and disposed behind said liquid crystal panel;
- wherein alignment directions of said alignment films are parallel with each other;
- an alignment direction of one of said alignment films is parallel with a polarizing axis of one of said first and second polarizers of said pair of polarizers adjacent thereto; and
- said polarizing axis of another of said first and second polarizers of said pair of polarizers is perpendicular to a longitudinal axis of said line light source; and
- wherein adverse effects due to birefringence in said transparent substrates caused by heat from said line light source is suppressed.

18. A liquid crystal display device according to claim 17, wherein said liquid crystal panel further comprises an optically anisotropic phase compensating film disposed at least one of between said first polarizer and said liquid crystal layer and between said second polarizer and said liquid crystal layer, for increasing acceptable viewing angles of said liquid crystal panel.

19. A liquid crystal display device according to claim 17, wherein said liquid crystal panel further comprises an optically anisotropic phase compensating film disposed at least one of between said first polarizer and said liquid crystal layer and between said second polarizer and said liquid crystal layer, for shifting an optimum direction of viewing said liquid crystal panel.

20. A liquid crystal display device according to claim 17, wherein said polarizing axis of said first polarizer of said pair of polarizers extends in parallel to the longitudinal axis of said line light source and said polarizing axis of said second polarizer of said pair of polarizers extends perpendicular to the longitudinal axis of said line light source.

* * * * *